US 11,825,142 B2

(12) United States Patent
Baumgartner et al.

(10) Patent No.: US 11,825,142 B2
(45) Date of Patent: Nov. 21, 2023

(54) SYSTEMS AND METHODS FOR MULTIMEDIA SWARMS

(71) Applicant: DIVX, LLC, San Diego, CA (US)

(72) Inventors: Hans Andreas Baumgartner, San Diego, CA (US); Francis Yee-Dug Chan, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 0 days.

(21) Appl. No.: 16/827,429

(22) Filed: Mar. 23, 2020

(65) Prior Publication Data

US 2020/0304854 A1 Sep. 24, 2020

Related U.S. Application Data

(60) Provisional application No. 62/991,526, filed on Mar. 18, 2020, provisional application No. 62/821,963, filed on Mar. 21, 2019.

(51) Int. Cl.
G06F 15/16 (2006.01)
H04N 21/2662 (2011.01)
(Continued)

(52) U.S. Cl.
CPC ......... H04N 21/2662 (2013.01); G06T 11/60 (2013.01); H04L 67/104 (2013.01);
(Continued)

(58) Field of Classification Search
CPC ............ H04N 21/2662; H04N 21/2187; G06T 11/60; H04L 67/104
See application file for complete search history.

(56) References Cited

U.S. PATENT DOCUMENTS 5,400,401 A 3/1995 Wasilewski et al.
5,574,785 A 11/1996 Ueno et al.
(Continued)

FOREIGN PATENT DOCUMENTS

CA 2237293 A1 7/1997
EP 1453319 A1 9/2004
(Continued)

OTHER PUBLICATIONS

"Information Technology—Coding of Audio Visual Objects—Part 2: Visual", International Standard, ISO/IEC 14496-2, Third Edition, Jun. 1, 2004, pp. 1-724. (presented in three parts).
(Continued)

Primary Examiner — Hieu T Hoang
(74) Attorney, Agent, or Firm — KPPB LLP

(57) ABSTRACT

Systems and methods for multimedia swarm processes in accordance with embodiments of the invention are illustrated. One embodiment includes a method for creating a multimedia project at a swarm interface device. The method includes steps for providing a first set of multimedia content to a swarm includes several swarm members, where the several swarm members includes several swarm sources. The method further includes steps for receiving a second set of multimedia content from the several swarm sources and editing multimedia content to create a multimedia project includes at least one piece of multimedia content from the first set of multimedia content and at least one piece of multimedia content from the second set of multimedia content.

23 Claims, 15 Drawing Sheets

(51) Int. Cl.
*G06T 11/60* (2006.01)
*H04N 21/2187* (2011.01)
*H04N 21/24* (2011.01)
*H04N 21/4402* (2011.01)
*H04L 67/104* (2022.01)
*H04N 21/2343* (2011.01)

(52) U.S. Cl.
CPC ..... *H04N 21/2187* (2013.01); *H04N 21/2343* (2013.01); *H04N 21/2402* (2013.01); *H04N 21/4402* (2013.01)

(56) References Cited

U.S. PATENT DOCUMENTS

| | | |
|---|---|---|
| 5,600,721 A | 2/1997 | Kitazato |
| 5,621,794 A | 4/1997 | Matsuda et al. |
| 5,642,338 A | 6/1997 | Fukushima et al. |
| 5,805,700 A | 9/1998 | Nardone et al. |
| 5,813,010 A | 9/1998 | Kurano et al. |
| 5,854,873 A | 12/1998 | Mori et al. |
| 5,907,658 A | 5/1999 | Murase et al. |
| 5,923,869 A | 7/1999 | Kashiwagi et al. |
| 6,002,834 A | 12/1999 | Hirabayashi et al. |
| 6,009,237 A | 12/1999 | Hirabayashi et al. |
| 6,016,381 A | 1/2000 | Taira et al. |
| 6,057,832 A | 5/2000 | Lev et al. |
| 6,065,050 A | 5/2000 | DeMoney |
| 6,266,483 B1 | 7/2001 | Okada et al. |
| 6,282,320 B1 | 8/2001 | Hasegawa et al. |
| 6,320,905 B1 | 11/2001 | Konstantinides |
| 6,351,538 B1 | 2/2002 | Uz |
| 6,373,803 B2 | 4/2002 | Ando et al. |
| 6,415,031 B1 | 7/2002 | Colligan et al. |
| 6,445,877 B1 | 9/2002 | Okada et al. |
| 6,453,115 B1 | 9/2002 | Boyle |
| 6,453,116 B1 | 9/2002 | Ando et al. |
| 6,504,873 B1 | 1/2003 | Vehvilaeinen |
| 6,512,883 B2 | 1/2003 | Shim et al. |
| 6,594,699 B1 | 7/2003 | Sahai et al. |
| 6,654,933 B1 | 11/2003 | Abbott et al. |
| 6,671,408 B1 | 12/2003 | Kaku |
| 6,690,838 B2 | 2/2004 | Zhou |
| 6,724,944 B1 | 4/2004 | Kalevo et al. |
| 6,751,623 B1 | 6/2004 | Basso et al. |
| 6,813,437 B2 | 11/2004 | Ando et al. |
| 6,871,006 B1 | 3/2005 | Oguz et al. |
| 6,912,513 B1 | 6/2005 | Candelore |
| 6,931,531 B1 | 8/2005 | Takahashi |
| 6,957,350 B1 | 10/2005 | Demos |
| 6,970,564 B1 | 11/2005 | Kubota et al. |
| 6,983,079 B2 | 1/2006 | Kim |
| 7,006,757 B2 | 2/2006 | Ando et al. |
| 7,007,170 B2 | 2/2006 | Morten |
| 7,020,287 B2 | 3/2006 | Unger |
| 7,151,832 B1 | 12/2006 | Fetkovich et al. |
| 7,188,183 B1 | 3/2007 | Paul et al. |
| 7,212,726 B2 | 5/2007 | Zetts |
| 7,242,772 B1 | 7/2007 | Tehranchi |
| 7,274,861 B2 | 9/2007 | Yahata et al. |
| 7,295,673 B2 | 11/2007 | Grab et al. |
| 7,349,886 B2 | 3/2008 | Morten et al. |
| 7,352,956 B1 | 4/2008 | Winter et al. |
| 7,382,879 B1 | 6/2008 | Miller |
| 7,397,853 B2 | 7/2008 | Kwon et al. |
| 7,400,679 B2 | 7/2008 | Kwon et al. |
| 7,418,132 B2 | 8/2008 | Hoshuyama |
| 7,457,415 B2 | 11/2008 | Reitmeier et al. |
| 7,499,930 B2 | 3/2009 | Naka et al. |
| 7,546,641 B2 | 6/2009 | Robert et al. |
| 7,602,973 B2 * | 10/2009 | Ii .......... H04N 19/647 |
| | | 382/248 |
| 7,639,921 B2 | 12/2009 | Seo et al. |
| 7,640,435 B2 | 12/2009 | Morten |
| 7,711,052 B2 | 5/2010 | Hannuksela et al. |
| 7,823,056 B1* | 10/2010 | Davey .......... G11B 27/34 |
| | | 715/202 |
| 7,853,980 B2 | 12/2010 | Pedlow, Jr. et al. |
| 7,864,186 B2 | 1/2011 | Robotham et al. |
| 7,945,143 B2 | 5/2011 | Yahata et al. |
| 8,131,875 B1 | 3/2012 | Chen |
| 8,169,916 B1 | 5/2012 | Pai et al. |
| 8,243,924 B2 | 8/2012 | Chen et al. |
| 8,286,213 B2 | 10/2012 | Seo |
| 8,312,079 B2 | 11/2012 | Newsome et al. |
| 8,369,421 B2 | 2/2013 | Kadono et al. |
| 8,612,517 B1* | 12/2013 | Yadid .......... H04N 21/845 |
| | | 709/201 |
| 8,649,669 B2 | 2/2014 | Braness et al. |
| 8,683,066 B2 | 3/2014 | Hurst et al. |
| 8,782,268 B2 | 7/2014 | Pyle et al. |
| 8,819,116 B1 | 8/2014 | Tomay et al. |
| 8,849,950 B2 | 9/2014 | Stockhammer et al. |
| 8,910,051 B2 | 12/2014 | Lussier et al. |
| 9,009,596 B2* | 4/2015 | Ortiz .......... G06F 16/4393 |
| | | 715/717 |
| 9,038,116 B1 | 5/2015 | Knox et al. |
| 9,076,041 B2 | 7/2015 | Bentley et al. |
| 9,106,804 B2 | 8/2015 | Roberts et al. |
| 9,143,601 B2 | 9/2015 | Padmanabhan et al. |
| 9,253,652 B1 | 2/2016 | Adib et al. |
| 9,280,545 B2 | 3/2016 | Padmanabhan et al. |
| 9,699,592 B2* | 7/2017 | El Khayat .......... H04L 67/18 |
| 9,749,367 B1* | 8/2017 | Kirby .......... G06Q 10/101 |
| 10,534,525 B1* | 1/2020 | Suchland .......... H04L 67/1097 |
| 2001/0021276 A1 | 9/2001 | Zhou |
| 2001/0052077 A1 | 12/2001 | Fung et al. |
| 2001/0052127 A1 | 12/2001 | Seo et al. |
| 2002/0048450 A1 | 4/2002 | Zetts |
| 2002/0067432 A1 | 6/2002 | Kondo et al. |
| 2002/0135607 A1 | 9/2002 | Kato et al. |
| 2002/0141503 A1 | 10/2002 | Kobayashi et al. |
| 2002/0154779 A1 | 10/2002 | Asano et al. |
| 2002/0164024 A1 | 11/2002 | Arakawa et al. |
| 2002/0169971 A1 | 11/2002 | Asano et al. |
| 2003/0002577 A1 | 1/2003 | Pinder |
| 2003/0004916 A1 | 1/2003 | Lewis |
| 2003/0044080 A1 | 3/2003 | Frishman et al. |
| 2003/0053541 A1 | 3/2003 | Sun et al. |
| 2003/0063675 A1 | 4/2003 | Kang et al. |
| 2003/0077071 A1 | 4/2003 | Lin et al. |
| 2003/0135742 A1 | 7/2003 | Evans |
| 2003/0142594 A1 | 7/2003 | Tsumagari et al. |
| 2003/0206717 A1 | 11/2003 | Yogeshwar et al. |
| 2004/0001594 A1 | 1/2004 | Krishnaswamy et al. |
| 2004/0022391 A1 | 2/2004 | Obrien |
| 2004/0028227 A1 | 2/2004 | Yu |
| 2004/0037421 A1 | 2/2004 | Truman |
| 2004/0047592 A1 | 3/2004 | Seo et al. |
| 2004/0047607 A1 | 3/2004 | Seo et al. |
| 2004/0059783 A1* | 3/2004 | Kazui .......... G06F 16/78 |
| | | 715/756 |
| 2004/0076237 A1 | 4/2004 | Kadono et al. |
| 2004/0081333 A1 | 4/2004 | Grab et al. |
| 2004/0093494 A1 | 5/2004 | Nishimoto et al. |
| 2004/0101059 A1 | 5/2004 | Joch et al. |
| 2004/0107356 A1 | 6/2004 | Shamoon et al. |
| 2004/0216173 A1* | 10/2004 | Horoszowski .......... G06F 16/739 |
| | | 725/135 |
| 2005/0013494 A1 | 1/2005 | Srinivasan et al. |
| 2005/0063541 A1 | 3/2005 | Candelore |
| 2005/0076232 A1 | 4/2005 | Kawaguchi |
| 2005/0144468 A1 | 6/2005 | Northcutt |
| 2005/0177741 A1 | 8/2005 | Chen et al. |
| 2005/0243912 A1 | 11/2005 | Kwon et al. |
| 2005/0265555 A1 | 12/2005 | Pippuri |
| 2006/0013568 A1 | 1/2006 | Rodriguez |
| 2006/0165163 A1 | 7/2006 | Burazerovic et al. |
| 2007/0047645 A1 | 3/2007 | Takashima |
| 2007/0067472 A1 | 3/2007 | Maertens et al. |
| 2007/0083467 A1 | 4/2007 | Lindahl et al. |
| 2007/0180051 A1 | 8/2007 | Kelly et al. |
| 2008/0044155 A1* | 2/2008 | Kuspa .......... G11B 27/34 |
| | | 386/282 |

(56) References Cited

U.S. PATENT DOCUMENTS

| | | |
|---|---|---|
| 2008/0086570 A1 | 4/2008 | Dey et al. |
| 2008/0101718 A1 | 5/2008 | Yang et al. |
| 2008/0137847 A1 | 6/2008 | Candelore et al. |
| 2009/0010622 A1 | 1/2009 | Yahata et al. |
| 2009/0013195 A1 | 1/2009 | Ochi et al. |
| 2009/0063419 A1* | 3/2009 | Nurminen ............... G06F 16/78 707/999.102 |
| 2009/0077143 A1 | 3/2009 | Macy, Jr. |
| 2009/0106082 A1 | 4/2009 | Senti et al. |
| 2009/0132599 A1 | 5/2009 | Soroushian et al. |
| 2009/0178090 A1 | 7/2009 | Oztaskent |
| 2009/0249081 A1 | 10/2009 | Zayas |
| 2009/0282103 A1* | 11/2009 | Thakkar ............. H04N 21/4314 709/204 |
| 2009/0282162 A1 | 11/2009 | Mehrotra et al. |
| 2009/0310819 A1 | 12/2009 | Hatano |
| 2010/0005498 A1* | 1/2010 | Lanahan ............ G06F 16/9535 725/109 |
| 2010/0142915 A1 | 6/2010 | Mcdermott et al. |
| 2011/0010466 A1 | 1/2011 | Fan et al. |
| 2011/0010623 A1* | 1/2011 | Vanslette ................. H04N 5/77 715/704 |
| 2011/0058675 A1 | 3/2011 | Brueck et al. |
| 2011/0096828 A1 | 4/2011 | Chen et al. |
| 2011/0103374 A1 | 5/2011 | Lajoie et al. |
| 2011/0135090 A1 | 6/2011 | Chan et al. |
| 2011/0145858 A1 | 6/2011 | Philpott et al. |
| 2011/0173345 A1 | 7/2011 | Knox et al. |
| 2011/0179185 A1 | 7/2011 | Wang et al. |
| 2011/0197261 A1 | 8/2011 | Dong et al. |
| 2011/0246661 A1 | 10/2011 | Manzari et al. |
| 2011/0296048 A1 | 12/2011 | Knox et al. |
| 2011/0314130 A1 | 12/2011 | Strasman |
| 2012/0005312 A1 | 1/2012 | Mcgowan et al. |
| 2012/0042090 A1 | 2/2012 | Chen et al. |
| 2012/0047542 A1 | 2/2012 | Lewis et al. |
| 2012/0110120 A1 | 5/2012 | Willig et al. |
| 2012/0117194 A1* | 5/2012 | Huang ................. G06F 40/197 709/219 |
| 2012/0167132 A1 | 6/2012 | Mathews et al. |
| 2012/0311174 A1 | 12/2012 | Bichot et al. |
| 2012/0331167 A1 | 12/2012 | Hunt |
| 2013/0013803 A1 | 1/2013 | Bichot et al. |
| 2013/0080267 A1 | 3/2013 | McGowan |
| 2013/0132836 A1* | 5/2013 | Ortiz ................. H04N 21/2743 715/716 |
| 2013/0259447 A1 | 10/2013 | Sathish et al. |
| 2014/0052738 A1* | 2/2014 | Connell-Giammatteo ................. G06F 16/44 707/748 |
| 2014/0140253 A1 | 5/2014 | Lohmar et al. |
| 2014/0149557 A1 | 5/2014 | Lohmar et al. |
| 2014/0186004 A1* | 7/2014 | Hamer ................. G11B 27/031 386/223 |
| 2014/0187315 A1 | 7/2014 | Perry |
| 2014/0282826 A1* | 9/2014 | Bastide ................ G06F 40/18 726/1 |
| 2014/0324981 A1 | 10/2014 | Cropper et al. |
| 2014/0365432 A1 | 12/2014 | Jain et al. |
| 2015/0043892 A1* | 2/2015 | Groman ............ H04N 21/2541 386/278 |
| 2015/0106527 A1* | 4/2015 | Li ........................... G06F 16/95 709/227 |
| 2015/0149906 A1* | 5/2015 | Toff ..................... G11B 27/031 715/723 |
| 2015/0187389 A1* | 7/2015 | Horita ................. G11B 31/006 386/264 |
| 2015/0288530 A1 | 10/2015 | Oyman |
| 2015/0355724 A1* | 12/2015 | Krug ................... G06F 3/03543 348/705 |
| 2016/0155475 A1 | 6/2016 | Hamer |
| 2016/0344777 A1* | 11/2016 | Fahlgren ............. H04L 65/1073 |
| 2017/0095741 A1 | 4/2017 | Perry et al. |
| 2017/0155927 A1* | 6/2017 | Wei ....................... H04N 21/234 |
| 2017/0338903 A1* | 11/2017 | Oldfield ............... G10H 1/0008 |
| 2017/0345459 A1* | 11/2017 | Manville ............. H04N 21/2402 |
| 2018/0310033 A1* | 10/2018 | Johnson ............. H04N 21/2187 |
| 2019/0020853 A1* | 1/2019 | Segal .................. H04N 21/6587 |
| 2019/0096438 A1* | 3/2019 | Shafir Nir ........ H04N 21/47205 |

FOREIGN PATENT DOCUMENTS

| | | |
|---|---|---|
| EP | 1283640 B1 | 10/2006 |
| EP | 2180664 A1 | 4/2010 |
| EP | 2360923 A1 | 8/2011 |
| EP | 2932709 B1 | 8/2019 |
| EP | 3942437 A1 | 1/2022 |
| KR | 20040039852 A | 5/2004 |
| KR | 20060106250 A | 10/2006 |
| RU | 2328040 C2 | 6/2008 |
| WO | 2000049762 A2 | 8/2000 |
| WO | 2000049763 A1 | 8/2000 |
| WO | 2003047262 A2 | 6/2003 |
| WO | 2004012378 A2 | 2/2004 |
| WO | 2004100158 A1 | 11/2004 |
| WO | 2005008385 A2 | 1/2005 |
| WO | 2005015935 A1 | 2/2005 |
| WO | 2009006302 A1 | 1/2009 |
| WO | 2009109976 A2 | 9/2009 |
| WO | 2011087449 A1 | 7/2011 |
| WO | 2011101371 A1 | 8/2011 |
| WO | 2011103364 A1 | 8/2011 |
| WO | 2017132197 A1 | 8/2017 |
| WO | 2020191406 A1 | 9/2020 |

OTHER PUBLICATIONS

"Java Cryptography Architecture API Specification & Reference", Available at https://docs.oracle.eom/javase/1.5.0/docs/guide/security/CryptoSpec.html, Jul. 25, 2004, 68 pgs.

"Java Cryptography Extension, javax.crypto.Cipher class", Available at https://docs.oracle.eom/javase/1.5.0/docs/api/javax/crypto/Cipher.html, 2004, 24 pgs.

"JCE Encryption—Data Encryption Standard (DES) Tutorial", Available at https://mkyong.com/java/jce-encryption-data-encryption-standard-des-tutorial/, Feb. 25, 2009, 2 pgs.

"Live and On-Demand Video with Silverlight and IIS Smooth Streaming", Microsoft Silverlight, Windows Server Internet Information Services 7.0, Feb. 2010, 15 pgs.

"Microsoft Smooth Streaming specification", Jul. 22, 2013, 56 pgs.

"OpenDML AVI File Format Extensions Version 1.02", OpenDML AVI MJPEG File Format Subcommittee. Last revision: Feb. 28, 1996. Reformatting Sep. 1997, 42 pgs.

"Single-Encode Streaming for Multiple Screen Delivery", Telestream Wowza Media Systems, 2009, 6 pgs.

"The MPEG-DASH Standard for Multimedia Streaming Over the Internet", IEEE MultiMedia, vol. 18, No. 4, 2011, 7 pgs.

"Windows Media Player 9", Microsoft, Mar. 23, 2017, 3 pgs.

Abomhara et al., "Enhancing Selective Encryption for H.264/AVC Using Advanced Encryption Standard", International Journal of computer Theory and Engineering, Apr. 2010, vol. 2, No. 2, pp. 223-229.

Alattar et al., A.M. "Improved selective encryption techniques for secure transmission of MPEG video bit-streams", In Proceedings 1999 International Conference on Image Processing (Cat. 99CH36348), vol. 4, IEEE, 1999, pp. 256-260.

Antoniou et al., "Adaptive Methods for the Transmission of Video Streams in Wireless Networks", 2015, 50 pgs.

Apostolopoulos et al., "Secure Media Streaming and Secure Transcoding", Multimedia Security Technologies for Digital Rights Management, 2006, 33 pgs.

Asai et al., "Essential Factors for Full-Interactive VOD Server: Video File System, Disk Scheduling, Network", Proceedings of Globecom '95, Nov. 14-16, 1995, 6 pgs.

Beker et al., "Cipher Systems, The Protection of Communications", 1982, 40 pgs.

Bocharov et al., "Portable Encoding of Audio-Video Objects, The Protected Interoperable File Format (PIFF)", Microsoft Corporation, First Edition Sep. 8, 2009, 30 pgs.

(56) References Cited

OTHER PUBLICATIONS

Buczkowski, "Panama new location-based video sharing app", printed Feb. 24, 2020 from https://geoawesomeness.com/panama-location-based-video-app/, 3 pgs.
Bulterman et al., "Synchronized Multimedia Integration Language (SMIL 3.0)", W3C Recommendation, Dec. 1, 2008, https://www.w3.org/TR/2008/REC-SMIL3-20081201/, 321 pgs. (presented in five parts).
Cahill et al., "Locally Adaptive Deblocking Filter for Low Bit Rate Video", Proceedings 2000 International Conference on Image Processing, Sep. 10-13, 2000, Vancouver, BC, Canada, 4 pgs.
Candelore, U.S. Appl. No. 60/372,901, filed Apr. 17, 2002, 5 pgs.
Chaddha et al., "A Frame-work for Live Multicast of Video Streams over the Internet", Proceedings of 3rd IEEE International Conference on Image Processing, Sep. 19, 1996, Lausanne, Switzerland, 4 pgs.
Cheng, "Partial Encryption for Image and Video Communication", Thesis, Fall 1998, 95 pgs.
Cheng et al., "Partial encryption of compressed images and videos", IEEE Transactions on Signal Processing, vol. 48, No. 8, Aug. 2000, 33 pgs.
Cheung et al., "On the Use of Destination Set Grouping to Improve Fairness in Multicast Video Distribution", Proceedings of IEEE INFOCOM'96, Conference on Computer Communications, vol. 2, IEEE, 1996, 23 pgs.
Collet, "Delivering Protected Content, An Approach for Next Generation Mobile Technologies", Thesis, 2010, 84 pgs.
Diamantis et al., "Real Time Video Distribution using Publication through a Database", Proceedings SIBGRAPI'98. International Symposium on Computer Graphics, Image Processing, and Vision (Cat. No.98EX237), Oct. 1990, 8 pgs.
Dworkin, "Recommendation for Block Cipher Modes of Operation: Methods and Techniques", NIST Special Publication 800-38A, 2001, 66 pgs.
Fang et al., "Real-time deblocking filter for MPEG-4 systems", Asia-Pacific Conference on Circuits and Systems, Oct. 28-31, 2002, Bail, Indonesia, 4 pgs.
Fecheyr-Lippens, "A Review of HTTP Live Streaming", Jan. 2010, 38 pgs.
Fielding et al., "Hypertext Transfer Protocol—HTTP1.1", Network Working Group, RFC 2616, Jun. 1999, 114 pgs.
Fukuda et al., "Reduction of Blocking Artifacts by Adaptive DCT Coefficient Estimation in Block-Based Video Coding", Proceedings 2000 International Conference on Image Processing, Sep. 10-13, 2000, Vancouver, BC, Canada, 4 pgs.
Harper, "GPS Meets Video. Do We Need a Standard for Geotagging Videos?", printed Feb. 24, 2020 from https://www.safe.com/blog/2012/04/pgs-meets-video-do-we-need-a-standard-for-geotagging-videos/, 14 pgs.
Huang, U.S. Pat. No. 7,729,426, U.S. Appl. No. 11/230,794, filed Sep. 20, 2005, 143 pgs.
Huang et al., "Adaptive MLP post-processing for block-based coded images", IEEE Proceedings—Vision, Image and Signal Processing, vol. 147, No. 5, Oct. 2000, pp. 463-473.
Information Technology—MPEG Systems Technologies—Part 7: Common Encryption in ISO Base Media File Format Files (ISO/IEC 23001-7), Apr. 2015, 24 pgs.
International Search Report for International Application No. PCT/US2020/024294, Search completed on Jun. 2, 2020, dated Jun. 26, 2020, 10 Pgs.
ISO/IEC 14496-12 Information technology—Coding of audio-visual objects—Part 12: ISO base media file format, Feb. 2004 ("MPEG-4 Part 12 Standard"), 62 pgs.
ISO/IEC 14496-12:2008(E) Informational Technology—Coding of Audio-Visual Objects Part 12: ISO Base Media Filea Format, Oct. 2008, 120 pgs.
ISO/IEC Fcd 23001-6 MPEG systems technologies Part 6: Dynamic adaptive streaming over HTTP (DASH), Jan. 28, 2011, 86 pgs.
Microsoft Corporation, Advanced Systems Format (ASF) Specification, Revision 01.20.03, Dec. 2004, 121 pgs.
MPEG-DASH presentation at Streaming Media West 2011, Nov. 2011, 14 pgs.
Pomelo, LLC Tech Memo, Analysis of Netflix's Security Framework for 'Watch Instantly' Service, Mar.-Apr. 2009, 18 pgs.
Server-Side Stream Repackaging (Streaming Video Technologies Panorama, Part 2), Jul. 2011, 15 pgs.
Text of ISO/IEC 23001-6: Dynamic adaptive streaming over HTTP (DASH), Oct. 2010, 71 pgs.
Universal Mobile Telecommunications System (UMTS), ETSI TS 126 233 V9.1.0 (Jun. 2011) 3GPP TS 26.233 version 9.1.0 Release 9, 18 pgs.
Universal Mobile Telecommunications Systems (UMTS); ETSI TS 126 244 V9.4.0 (May 2011) 3GPP TS 26.244 version 9.4.0 Release 9, 58 pgs.
"Apple HTTP Live Streaming specification", Aug. 2017, 60 pgs.
"Data Encryption Decryption using AES Algorithm, Key and Salt with Java Cryptography Extension", Available at https://www.digizol.com/2009/10/java-encrypt-decrypt-jce-salt.html, Oct. 200, 6 pgs.
"Delivering Live and On-Demand Smooth Streaming", Microsoft Silverlight, 2009, 28 pgs.
"HTTP Based Adaptive Streaming over HSPA", Apr. 2011, 73 pgs.
"HTTP Live Streaming", Mar. 2011, 24 pgs.
"HTTP Live Streaming", Sep. 2011, 33 pgs.
Huang et al., "Architecture Design for Deblocking Filter in H.264/JVT/AVC", 2003 International Conference on Multimedia and Expo., Jul. 6-9, 2003, Baltimore, MD, 4 pgs.
Jain et al., U.S. Appl. No. 61/522,623, filed Aug. 11, 2011, 44 pgs.
Jung et al., "Design and Implementation of an Enhanced Personal Video Recorder for DTV", IEEE Transactions on Consumer Electronics, vol. 47, No. 4, Nov. 2001, 6 pgs.
Kalva, Hari "Delivering MPEG-4 Based Audio-Visual Services", 2001, 113 pgs.
Kang et al., "Access Emulation and Buffering Techniques for Steaming of Non-Stream Format Video Files", IEEE Transactions on Consumer Electronics, vol. 43, No. 3, Aug. 2001, 7 pgs.
Kim et al., "A Deblocking Filter with Two Separate Modes in Block-based Video Coding", IEEE transactions on circuits and systems for video technology, vol. 9, No. 1, 1999, pp. 156-160.
Kim et al., "Tree-Based Group Key Agreement", Feb. 2004, 37 pgs.
Kohler et al., "Geolocating Images with Crowdsourcing and Diagramming", in Proceedings of the Twenty-Seventh International Joint Conference on Artificial Intelligence (IJCAI-18), pp. 5299-5303.
Laukens, "Adaptive Streaming—A Brief Tutorial", EBU Technical Review, 2011, 6 pgs.
Legault et al., "Professional Video Under 32-bit Windows Operating Systems", SMPTE Journal, vol. 105, No. 12, Dec. 1996, 10 pgs.
Li et al., "Layered Video Multicast with Retransmission (LVMR): Evaluation of Hierarchical Rate Control", Proceedings of IEEE INFOCOM'98, the Conference on Computer Communications. Seventeenth Annual Joint Conference of the IEEE Computer and Communications Societies. Gateway to the 21st Century, Cat. No. 98, vol. 3, 1998, 26 pgs.
List et al., "Adaptive deblocking filter", IEEE transactions on circuits and systems for video technology, vol. 13, No. 7, Jul. 2003, pp. 614-619.
Massoudi et al., "Overview on Selective Encryption of Image and Video: Challenges and Perspectives", EURASIP Journal on Information Security, Nov. 2008, 18 pgs.
McCanne et al., "Receiver-driven Layered Multicast", Conference proceedings on Applications, technologies, architectures, and protocols for computer communications, Aug. 1996, 14 pgs.
Meier, "Reduction of Blocking Artifacts in Image and Video Coding", IEEE Transactions on Circuits and Systems for Video Technology, vol. 9, No. 3, Apr. 1999, pp. 490-500.
Nelson, "Smooth Streaming Deployment Guide", Microsoft Expression Encoder, Aug. 2010, 66 pgs.
Newton et al., "Preserving Privacy by De-identifying Facial Images", Carnegie Mellon University School of Computer Science, Technical Report, CMU-CS-03-119, Mar. 2003, 26 pgs.
O'Brien, U.S. Appl. No. 60/399,846, filed Jul. 30, 2002, 27 pgs.

(56) References Cited

OTHER PUBLICATIONS

O'Rourke, "Improved Image Decompression for Reduced Transform Coding Artifacts", IEEE Transactions on Circuits and Systems for Video Technology, vol. 5, No. 6, Dec. 1995, pp. 490-499.
Park et al., "A postprocessing method for reducing quantization effects in low bit-rate moving picture coding", IEEE Transactions on Circuits and Systems for Video Technology, vol. 9, No. 1, Feb. 1999, pp. 161-171.
Richardson, "H.264 and MPEG-4 Video Compression", Wiley, 2003, 306 pgs. (presented in 2 parts).
Sima et al., "An Efficient Architecture for Adaptive Deblocking Filter of H.264 AVC Video Coding", IEEE Transactions on Consumer Electronics, vol. 50, No. 1, Feb. 2004, pp. 292-296.
Spanos et al., "Performance Study of a Selective Encryption Scheme for the Security of Networked, Real-Time Video", Proceedings of the Fourth International Conference on Computer Communications and Networks, IC3N'95, Sep. 20-23, 1995, Las Vegas, NV, pp. 2-10.
Srinivasan et al., "Windows Media Video 9: overview and applications", Signal Processing: Image Communication, 2004, 25 pgs.
Stockhammer, "Dynamic Adaptive Streaming over HTTP—Standards and Design Principles", Proceedings of the second annual ACM conference on Multimedia, Feb. 2011, pp. 133-145.
Timmerer et al., "HTTP Streaming of MPEG Media", Proceedings of Streaming Day, 2010, 4 pgs.
Tiphaigne et al., "A Video Package for Torch", Jun. 2004, 46 pgs.
Trappe et al., "Key Management and Distribution for Secure Multimedia Multicast", IEEE Transaction on Multimedia, vol. 5, No. 4, Dec. 2003, pp. 544-557.
Van Deursen et al., "On Media Delivery Protocols in the Web", 2010 IEEE International Conference on Multimedia and Expo, Jul. 19-23, 2010, 6 pgs.
Ventura, Guillermo Albaida "Streaming of Multimedia Learning Objects", AG Integrated Communication System, Mar. 2003, 101 pgs.
Waggoner, "Compression for Great Digital Video", 2002, 184 pgs.
Watanabem et al., "MPEG-2 decoder enables DTV trick plays", esearcher System LSI Development Lab, Fujitsu Laboratories Ltd., Kawasaki, Japan, Jun. 2001, 2 pgs.
Wiegand, "Joint Video Team (JVT) of ISO/IEC MPEG and ITU-T VCEG", Jan. 2002, 70 pgs.
Willig et al., U.S. Appl. No. 61/409,285, filed Nov. 2, 2010, 43 pgs.
Yang et al., "Projection-Based Spatially Adaptive Reconstruction of Block-Transform Compressed Images", IEEE Transactions on Image Processing, vol. 4, No. 7, Jul. 1995, pp. 896-908.
Yang et al., "Regularized Reconstruction to Reduce Blocking Artifacts of Block Discrete Cosine Transform Compressed Images", IEEE Transactions on Circuits and Systems for Video Technology, vol. 3, No. 6, Dec. 1993, pp. 421-432.
Yu et al., "Video deblocking with fine-grained scalable complexity for embedded mobile computing", Proceedings 7th International Conference on Signal Processing, Aug. 31-Sep. 4, 2004, pp. 1173-1178.
Zakhor, "Iterative Procedures for Reduction of Blocking Effects in Transform Image Coding", IEEE Transactions on Circuits and Systems for Video Technology, vol. 2, No. 1, Mar. 1992, pp. 91-95.
International Preliminary Report on Patentability for International Application No. PCT/US2020/024294, dated Sep. 16, 2021, dated Sep. 30, 2021, 6 Pgs.
Extended European Search Report for European Application No. 20774346.9, Search completed Oct. 18, 2022, dated Oct. 26, 2022, 11 Pgs.

\* cited by examiner

SYSTEMS AND METHODS FOR MULTIMEDIA SWARMS

CROSS-REFERENCE TO RELATED APPLICATIONS

The current application claims priority to U.S. Provisional Patent Application No. 62/821,963, entitled "Systems and Methods for Swarms" and filed Mar. 21, 2019 and U.S. Provisional Patent Application No. 62/991,526, entitled "Systems and Methods for Multimedia Swarms" and filed Mar. 18, 2020. The disclosures of U.S. Provisional Patent Application Nos. 62/821,963 and 62/991,526 are incorporated by reference herein in their entirety.

FIELD OF THE INVENTION

The present invention generally relates to capturing and processing of images, video, sound and metadata from multiple cameras, and in particular to multimedia swarms.

BACKGROUND

Cameras are optical instruments used to capture images or video (i.e. sequential images that when displayed create the illusion of continuous motion). Modern cellular telephones come equipped with one or more multimedia capture devices (e.g., cameras, microphones, etc.). Telecommunications networks are used to transfer data, including images, video, and/or audio, to other networked devices.

Consumers increasingly have the option to stream live media content over the Internet. When content is streamed live, fragments of the content are provided to user equipment devices as the content is being created. These fragments are rendered by the user equipment devices as they arrive, permitting consumers to observe events, such as sports games, as the events develop. Live Internet streaming may be advantageous because it may give consumers access to kinds of programming that were until recently strictly in the domain of traditional television and radio broadcasting.

Streaming of live media content may be more technically challenging than non-live content streaming. Because live content is rendered at approximately the same time as it is captured, live content cannot be buffered for prolonged periods of time. The lack of extensive buffering in live content streaming may cause live content streaming to require greater network bandwidth and/or smaller network latency than non-live content streaming.

SUMMARY OF THE INVENTION

Systems and methods for multimedia swarm processes in accordance with embodiments of the invention are illustrated. One embodiment includes a method for creating a multimedia project at a swarm interface device. The method includes steps for providing a first set of multimedia content to a swarm includes several swarm members, where the several swarm members includes several swarm sources. The method further includes steps for receiving a second set of multimedia content from the several swarm sources and editing multimedia content to create a multimedia project includes at least one piece of multimedia content from the first set of multimedia content and at least one piece of multimedia content from the second set of multimedia content.

In a further embodiment, the multimedia project is a live stream, and editing multimedia content comprises providing streamed live content captured at the swarm interface device as part of the live stream, and providing streamed live content received from at least one of the several swarm sources as part of the live stream.

In still another embodiment, providing the first set of multimedia content includes streaming live content captured at the swarm interface device to a swarm member of the several swarm members, wherein streaming the live content includes transmitting the stream over a peer-to-peer network.

In a still further embodiment, the several swarm sources include a professional camera linked to a separate swarm interface device and at least a mobile device includes a camera, wherein the separate swarm interface device and the mobile device are communicatively linked to a set of one or more swarm servers.

In yet another embodiment, the method further includes steps for joining the swarm, wherein joining the swarm comprises displaying several available swarms based on at least a geographic location of the swarm interface device, receiving input selecting a particular swarm of the several available swarms, and joining the selected particular swarm.

In a yet further embodiment, providing the first set of multimedia content comprises determining a network condition for communications between the swarm interface device and a set of swarm servers, selecting a low-bandwidth format for the first set of multimedia content based on the determined network condition, formatting the first set of multimedia content to the selected low-bandwidth format, and providing the low-bandwidth format of the first set of multimedia content to the swarm.

In another additional embodiment, receiving a second set of multimedia content comprises receiving a low-bandwidth version of a particular piece of multimedia content of the second set of multimedia content to be presented in a graphical user interface at the swarm interface device, and upon determining that the particular piece of multimedia content has been added to the multimedia project, downloading, in a background process, a high-bandwidth version of the particular piece of multimedia content.

In a further additional embodiment, the multimedia project is a highlight reel, wherein editing multimedia content comprises identifying a third set of multimedia content includes at least one piece of content from the first set of multimedia content and at least one piece of content from the second set of multimedia content based on metadata associated with the first and second sets of multimedia content, wherein the metadata includes at least one of the set consisting of a synchronized timestamp, camera orientation, content rating, camera direction, focus object type, focus status, white level, white balance, audio level, and camera type, and creating the highlight reel based on the third set of multimedia content.

In another embodiment again, editing multimedia content further includes automatically creating a credits video segment by determining an author for each piece of multimedia content from the second set of multimedia content included in the multimedia project, and generating the credits video segment to provide attribution to the contributors of the multimedia content.

In a further embodiment again, editing multimedia content comprises displaying representations for at least one piece of multimedia content from each swarm source of the second set of multimedia content, displaying a map with a set of one or more indicators indicating a location on the map associated with the at least one piece of content and the associated swarm source, receive a selection of an indicator of the set of indicators to select an associated swarm source, and displaying representations for multimedia content from the second set of multimedia content from the associated swarm source that can be added to the multimedia project.

One embodiment includes a non-transitory machine readable medium containing processor instructions for creating a multimedia project at a swarm interface device, where execution of the instructions by a processor causes the processor to perform a process that comprises providing a first set of multimedia content to a swarm includes several swarm members, wherein the several swarm members includes several swarm sources, receiving a second set of multimedia content from the several swarm sources, and editing multimedia content to create a multimedia project includes at least one piece of multimedia content from the first set of multimedia content and at least one piece of multimedia content from the second set of multimedia content.

In a yet further embodiment again, the method further includes steps for receiving metadata the for second set of multimedia content, wherein the metadata includes at least one of the set consisting of location, direction, camera parameters, focus parameters, detected objects, synchronized time, text commentary, and hash tags.

In another additional embodiment again, the method further includes steps for displaying representations of the second set of multimedia, wherein the representations are sorted based at least in part on the received metadata.

In a further additional embodiment again, the method further includes steps for transmitting a set of control instructions to at least one of the several swarm sources to automatically modify capture settings of the at least one swarm source.

In still yet another additional embodiment, the method further includes steps for requesting removal of at least one piece of the provided first set of multimedia content from the several swarm members, wherein the at least one piece of multimedia content is automatically removed from each of the several swarm members.

In a further embodiment, the multimedia project is at least one of a scene reconstruction, an augmented reality (AR) presentation, and a virtual reality (VR) presentation.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1:
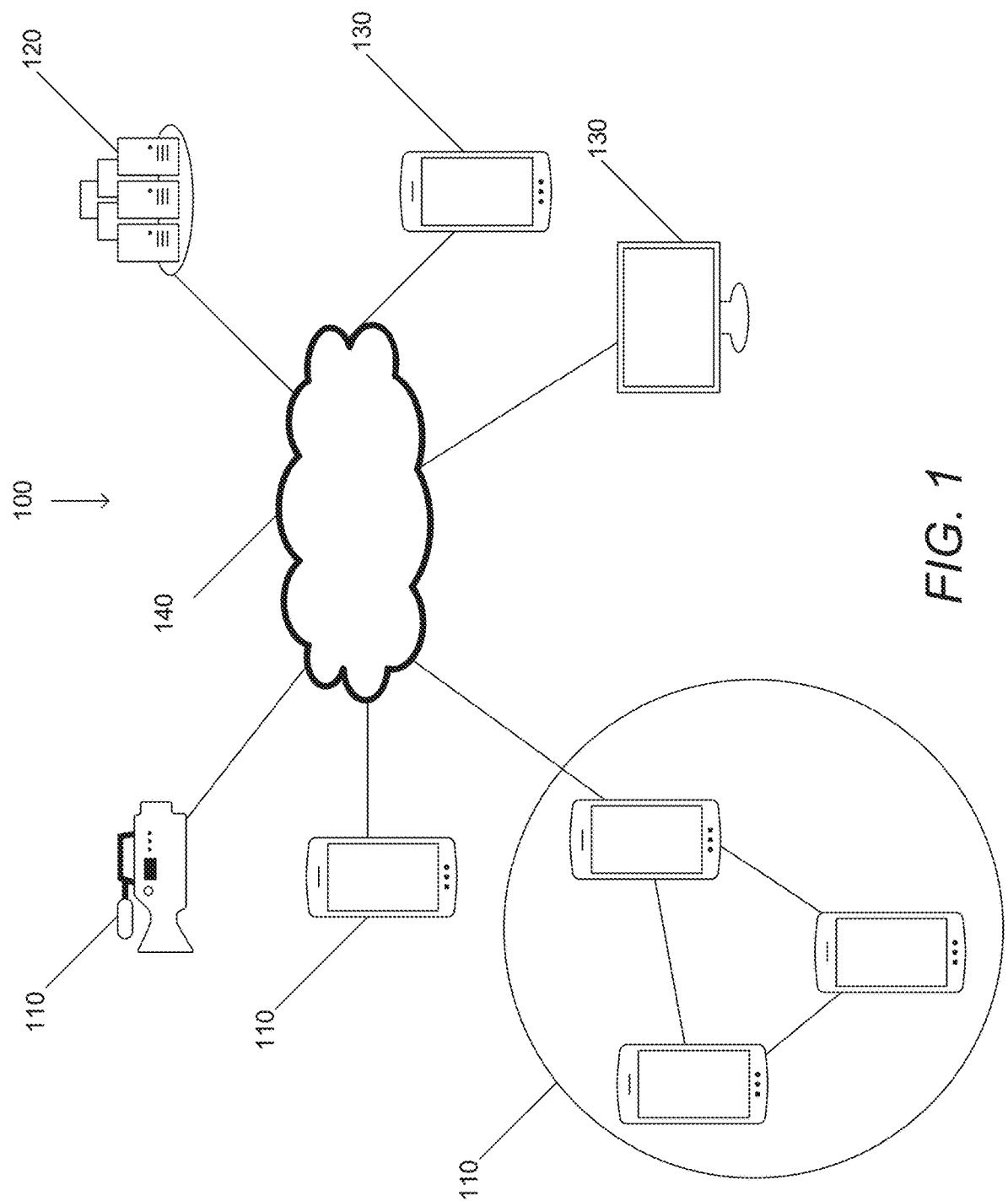
FIG. 1 illustrates a swarm processing system in accordance with an embodiment of the invention.

The ubiquity of smart phones has reached a threshold such that nearly every person has one. Not only will scheduled events such as, but not limited to, concerts, sports matches, family events, political rallies, or any other group gathering, have many cameras pointing at the action by merit of the smartphones in the audience, but spontaneous occurrences are now filmed by multiple individuals at an increasing rate. While more points of view on a given event provide additional opportunities to archive events, the amount of image data can be overwhelming and disjointed. In order to enable efficient processing and merging of multimedia data, swarm systems and methods can ingest multimedia content from multiple different sources to create high quality, immersive combination content.

"Swarms," as used throughout this specification can refer to collections (or groups) of devices (e.g. cameras, microphones, computers, etc.) that are associated with each other. Swarms can also include a swarm server system that provides swarm processes in accordance with a number of embodiments of the invention. Swarms in accordance with a number of embodiments of the invention can include groups of capture devices that are all capturing multimedia content at approximately the same location. For example, a sports arena having a pitch at the center and surrounded by an audience may have a swarm of capture devices, including, but not limited to, fans in the audience recording the pitch from different elevations and angles and positions around the pitch, as well as professional video capture devices operated by the stadium or news networks, or any other multimedia capture devices operating during the sporting event. In a variety of embodiments, video captures can include cameras that are permanently installed in a venue. Swarms are not limited to a specific event or location. Indeed, an event or multiple events of interest may occur in rapid succession across a moving location (e.g. a parade, a race, etc.), and different capture devices can capture the same event of interest at different times and locations. In many embodiments, users may join a swarm for a remote location (e.g., the Eiffel Tower).

Individuals that participate in (or are members of) a given swarm can then gain access to footage captured by a swarm (e.g., of an event of interest). Members of a swarm can refer to any of a number of different participants (or their associated device(s)) in the swarm, such as (but not limited to) contributors, sources, editors, and/or viewers. Systems and methods as described herein can collate multimedia data from capture devices in the swarm and generate cohesive multimedia content showing more than any single capture device.

However, in many embodiments, the set of capture devices that make up the swarm at any given time is heterogeneous. That is, there can be a large number of different device configurations from a hardware and/or software perspective. In many embodiments, the differences in configurations between the different capture devices results in videos that, if they were placed next to each other, would appear as if they were captured using different cameras. For example, the white balance between two pieces of video could be wildly different, despite having been shot in approximately the same location of approximately the same subject. Further, depending on the user of the capture device, other aspects of captured video can be different across multiple different video capture devices. For example, some video capture devices may record in "landscape" vs. "portrait" orientation when using their cellphones. In a variety of embodiments, video may be captured at non-standard angles. To create cohesive, homogeneous video from a heterogeneous swarm, systems and methods described herein can perform various swarm processes that normalize source video captured by video capture devices.

Although many of the examples described herein describe applications to video, one skilled in the art will recognize that similar systems and methods can be used in various multimedia applications, including (but not limited to) still captures, 3D video, audio, etc., without departing from this invention.

Swarm Processing Systems

Turning now to FIG. 1, a swarm processing system in accordance with an embodiment of the invention is illustrated. System 100 includes multimedia capture devices 110 that make up the swarm. In numerous embodiments, capture devices can be conventional video cameras, such as, but not limited to, those used for professional videography. In a variety of embodiments, capture devices can be mobile devices (e.g., cellphones, tablets, laptops, etc.) with integrated or attached cameras. Capture devices in accordance with certain embodiments of the invention can include audio capture devices (e.g., microphones). In some embodiments, capture devices can be networked together as "sub-swarms."

System 100 further includes a swarm processing server 120. In numerous embodiments, the swarm processing server can be implemented using multiple different servers as part of a "cloud" architecture. In many embodiments, swarm processing servers are capable of receiving video data (describing images and/or video) from many different video capture devices. In numerous embodiments, swarm processing servers normalize video data captured using multiple different video capture devices which may all have different settings and sensors. In numerous embodiments, normalization can include, but is not limited to, portrait/landscape compensation, white balance leveling, color correction, color normalization, video stabilization, refocusing, and/or any other normalization process as appropriate to the requirements of specific applications of embodiments of the invention.

System 100 further includes swarm interface devices 130. Swarm interface devices in accordance with several embodiments of the invention can perform various functions, such as (but not limited to) capturing content, providing content to a swarm, viewing swarm content, editing swarm content, and/or sharing swarm projects (e.g., presentations, live streams, etc.). In numerous embodiments, swarm interface devices are capable of performing similar swarm processes as swarm processing servers. In some embodiments, swarm interface devices can be implemented using the same hardware platform as capture devices. For example, a cellphone may be both an audio/video capture device, and a swarm interface device. In a variety of embodiments, swarm interface devices are capable of directing swarm processing servers to carry out various swarm processes. In a variety of embodiments, swarm interface devices can be implemented using cellphones, personal computers, tablet computers, smart TVs, video game consoles, production control room equipment, and/or any other interface system as appropriate to the requirements of specific applications of embodiments of the invention.

In many embodiments, capture devices, swarm interface devices, and swarm server systems are connected via a network 140. In many embodiments, the network 140 is the Internet. In numerous embodiments, the network is made up of many different networks. For example, the network can include cellular networks, WIFI networks, Bluetooth connections, and/or any other type of network as appropriate to the requirements of specific applications of embodiments of the invention. For example, in some embodiments, swarm interface devices of a given swarm can be connected to each other locally via a peer-to-peer network, while connecting to other elements of the swarm processing system (e.g., swarm processing servers) via a different second network (e.g., cellular networks, WIFI networks, etc.).

As can readily be appreciated the specific computing system used for swarm processing is largely dependent upon the requirements of a given application and should not be considered as limited to any specific computing system(s) implementation.

Figure 2:
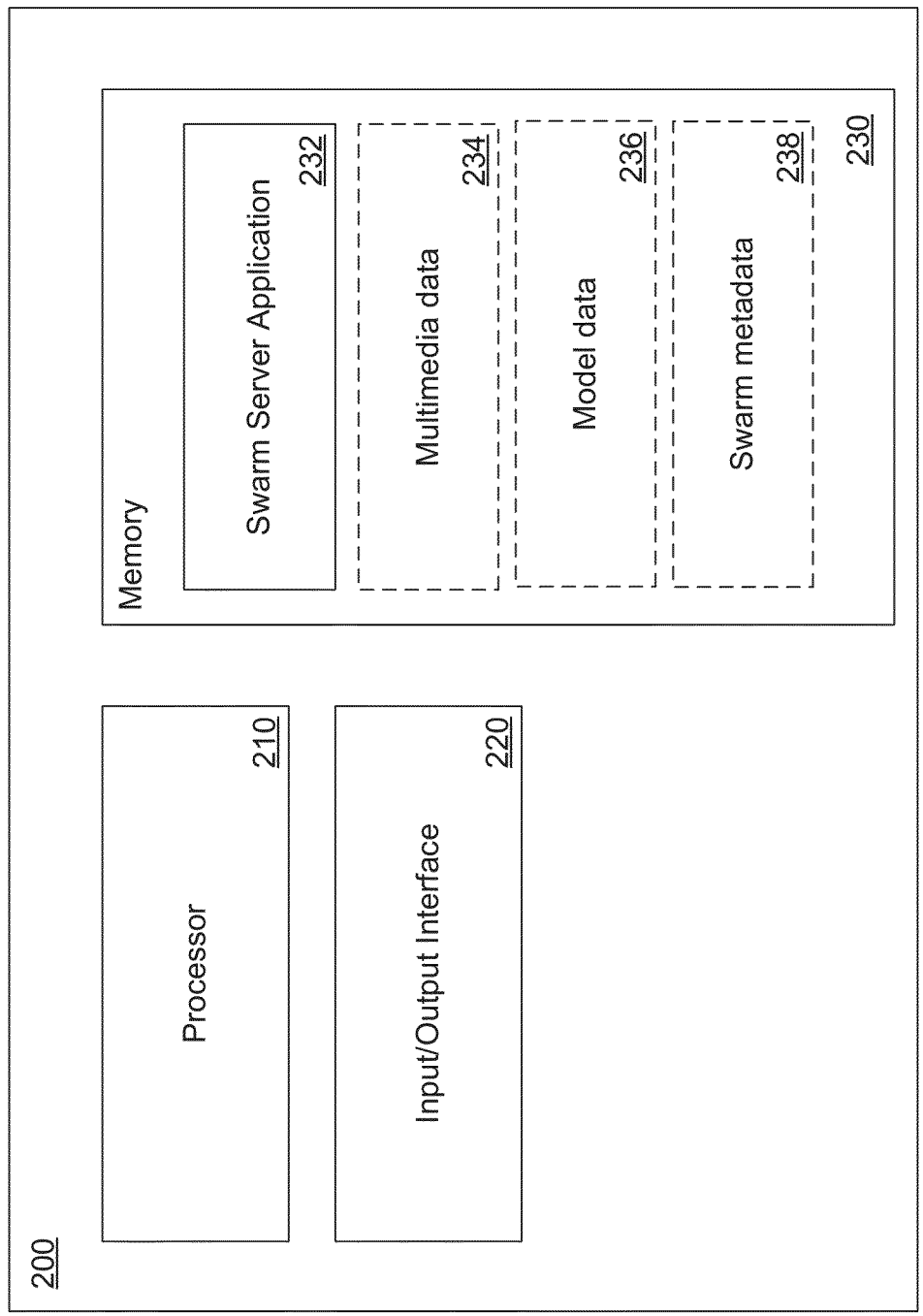
FIG. 2 illustrates an example of a swarm processing server in accordance with an embodiment of the invention.

An example of a swarm processing server in accordance with an embodiment of the invention is illustrated in FIG. 2. Swarm processing server 200 includes a processor 210, an input/output interface 220, and a memory 230. One skilled in the art will recognize that a swarm processing server may exclude certain components and/or include other components that are omitted for brevity without departing from this invention.

Processor 210 can be any type of logical processing circuitry such as, but not limited to, central processing units, graphics processing units, tensor processing units, neural processing units, field-programmable gate-arrays (FPGAs), application-specific integrated circuits (ASICs), and/or any other processing circuitry as appropriate to the requirements of specific applications of embodiments of the invention.

In a number of embodiments, input/output interfaces can include any of a variety of input/output interfaces, such as (but not limited to) network interfaces, display interfaces, user input interfaces, etc. In a variety of embodiments, input/output interfaces for a swarm processing server can allow the swarm processing server to communicate with various swarm interface devices, other swarm processing servers, cloud services, 3rd party applications, etc.

Memory 230 can be volatile, nonvolatile, or a combination of volatile and nonvolatile storage media. In numerous embodiments, memory 230 includes a swarm server application 232. Swarm server applications can direct processors to carry out various swarm server processes, such as (but not limited to) managing swarms, processing swarm content, communicating with members of a swarm, distributing content, etc.

In this example, memory 230 includes multimedia data 234, model data 236 and swarm metadata 238. Multimedia data in accordance with a number of embodiments of the invention can be obtained from capture devices (e.g., over a network, via onboard cameras, etc.). In numerous embodiments, model data can include model parameters and/or training data used for training a model. Models in accordance with a number of embodiments of the invention can be used for various processes, such as (but not limited to) processing multimedia data, object identification, image segmentation, natural language processing, audio synchronization, etc. Swarm metadata in accordance with many embodiments of the invention can describe various properties of the swarm and/or multimedia content of the swarm. In a variety of embodiments, swarm metadata can be pulled from the multimedia content, received from swarm interface devices, and/or determined from the received multimedia content (e.g., object identification). Swarm metadata can include metadata related to the swarm itself, such as, but not limited to, identification information regarding the video capture devices that make up the swarm, geolocation data describing the location of the swarm, descriptive data (e.g., title, description, comments, hashtags, etc.) and/or event data describing the event that the swarm is recording. In a variety of embodiments, swarm metadata can include content metadata related to the individual content, such as (but not limited to) sensor data describing a capture (e.g., an orientation of the camera when the capture was made, camera type, capture parameters, focus parameters, etc.), multimedia characteristics (e.g., resolution, frame rate, etc.), position data (e.g., location data, orientation data or direction data), ratings (e.g., favorites, starred, etc.), focus data (e.g., focal distance, in-focus, etc.), white level, white balance, and/or audio levels. In many embodiments, swarm metadata can include generated metadata that can be generated by a swarm processing system, such as (but not limited to) detected objects and/or synchronized timestamps. Although many examples of swarm metadata are described throughout this application, one skilled in the art will recognize that swarm data may include other data regarding the swarm, swarm members, and/or swarm content as appropriate to the requirements of specific applications of embodiments of the invention.

Although a specific example of a swarm processing server is illustrated in this Figure, any of a variety of swarm processing servers can be utilized to perform processes for swarm processing processes similar to those described herein as appropriate to the requirements of specific applications in accordance with embodiments of the invention.

Figure 3:
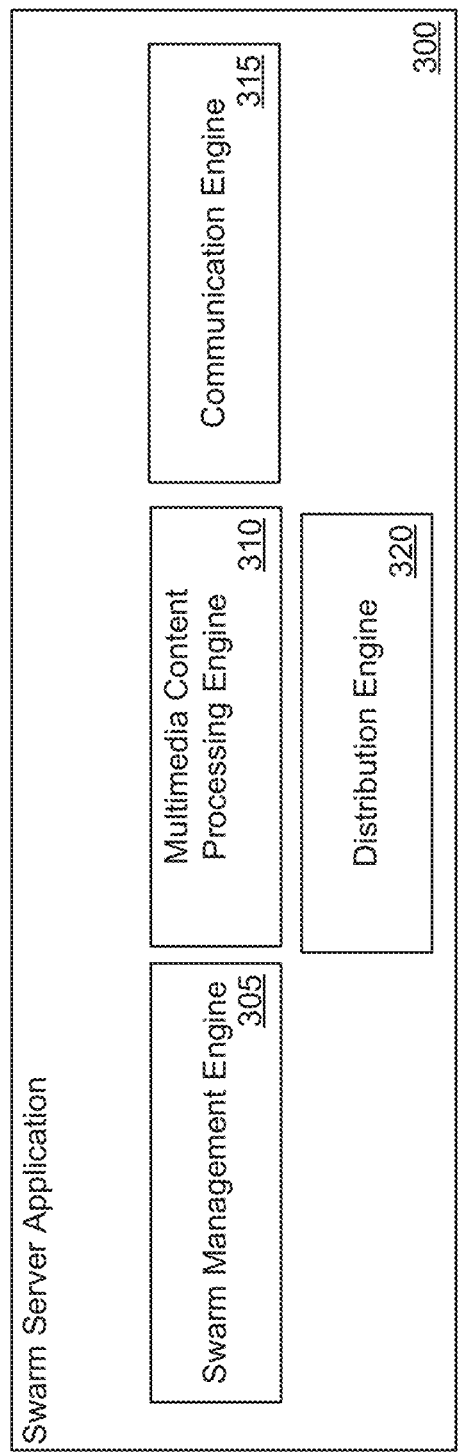
FIG. 3 illustrates an example of a swarm server application in accordance with an embodiment of the invention.

An example of a swarm server application in accordance with an embodiment of the invention is illustrated in FIG. 3. Swarm server application 300 includes swarm management engine 305, multimedia content processing engine 310, communication engine 315, and distribution engine 320. One skilled in the art will recognize that a swarm server application may exclude certain components and/or include other components that are omitted for brevity without departing from this invention.

Swarm management engines in accordance with many embodiments of the invention can manage swarms to enable users to create new swarms, to search for existing swarms, and/or to join an existing swarm. New swarms in accordance with numerous embodiments of the invention can be public and available to any user who wants to join. In a number of embodiments, swarm management systems can create private swarms, where users can be blocked or restricted. In a number of embodiments, private swarms are not displayed in search results and/or only allow users to join by invitation (e.g., email, text, social media, URL, QR code, password, etc.). Invitations in accordance with many embodiments of the invention can be single-use and/or multi-use, allowing multiple users to join a swarm from a single invitation. In various embodiments, invitations can be displayed (e.g., QR codes, URLs, etc.) to allow users to join a particular swarm. For example, invitations can be displayed at a venue or on individual tickets to allow spectators at an event to join the swarm to capture and/or view swarm content.

In a variety of embodiments, multimedia content processing engines can process multimedia content received from various capture devices of the swarms (or swarm content). Processing multimedia content can include various functions, such as (but not limited to) searching, viewing, normalizing, synchronizing, and/or otherwise editing the multimedia content. In numerous embodiments, multimedia can be transcoded for streaming to swarm interface devices. Transcoded streams in accordance with some embodiments of the invention can include trick play tracks that allow for trick play (e.g., fast forward, rewind) in streamed content. Alternatively, or conjunctively, rather than directly processing the multimedia content, multimedia content processing engines in accordance with a number of embodiments of the invention can communicate with swarm interface devices to instruct the swarm interface devices to process multimedia content prior to sending the content to a swarm server.

Normalizing swarm content in accordance with several embodiments of the invention can include various processes to facilitate the creation of multimedia projects (e.g., presentations, live streams, etc.) with content from multiple heterogeneous sources. Such processes can include (but are not limited to) converting between portrait and landscape orientations, transcoding between file formats, resizing content (e.g., zoom, crop, etc.), normalizing audio, normalizing brightness levels, and/or normalizing color temperature.

In many embodiments, multimedia content processing engines can synchronize swarm content to a single swarm timeline. Synchronizing swarm content can allow editors to see swarm content captured at a given time from each of a variety of different positions and angles. In a variety of embodiments, a single swarm timeline may be used for projects (e.g., presentations, live streams) built from swarm content of a given swarm. Synchronizing content from heterogeneous sources in accordance with some embodiments of the invention can be done in a variety of ways, including (but not limited to) signal fingerprinting and/or watermarking.

Synchronizing swarm content in accordance with various embodiments of the invention can be performed based on drift calculations. In many embodiments, swarm servers can broadcast a drift request to swarm interface devices in a given swarm and can calculate the drift (or latency) based on the acknowledgements received from the different swarm interface devices. Acknowledgments from the swarm interface devices in accordance with certain embodiments of the invention can include various state information such as (but not limited to bandwidth and current play state. In a variety of embodiments, drift calculation can be initiated via peer-to-peer requests, where swarm interface devices periodically broadcast to their swarm that a drift calculation needs to be performed. Drift calculations can then be performed by a swarm servers and/or swarm interface devices of the swarm. In numerous embodiments, synchronizing information can be calculated based on the swarm content and the drift. In certain embodiments, synchronizing information (e.g., based on drift calculations) can be used to adjust timestamps recorded at the swarm interface devices so that content on heterogeneous devices can maintain more accurate (or synchronous) timestamps for swarm content.

Multimedia content processing engines in accordance with numerous embodiments of the invention can automatically edit swarm content. For example, in some embodiments, multimedia content processing engines can generate highlight reels based on swarm content (e.g., based on time, location, identified persons, etc.). In numerous embodiments, automatically generated content can use normalized and/or synchronized swarm content to generate content for a given event or topic. Selection of content automatically generated content in accordance with numerous embodiments of the invention can be based on various factors, such as (but not limited to) likes, views, incorporations into projects, comments, image quality, hashtags, comments, audio quality, etc. In many embodiments, when a swarm project uses swarm content of multiple members, multimedia content processing engines can automatically create a credits video sequence to provide attribution to the contributors for the swarm video segments included in a given project. Rather than being presented as a separate credits video sequence, credits in accordance with a number of embodiments of the invention can be generated as an overlay over a portion of the video of a multimedia project.

Communication engines in accordance with certain embodiments of the invention can send and/or receive swarm information with swarm interface devices. In a variety of embodiments, communication engines can manage requests for swarm content in a hierarchical manner. For example, communication engines in accordance with a number of embodiments of the invention can provide (or request) one or more low-bandwidth versions (e.g., cover art, thumbnails, animated thumbnails, low-resolution video, etc.) of swarm content based on available bandwidth and/or other network conditions between a swarm interface device and the swarm servers. In several embodiments, when network conditions do not allow for higher bandwidth versions to be transmitted, communication engines can instruct swarm interface devices to communicate the content locally (e.g., over a mesh network, via peer-to-peer connections, etc.). In some embodiments, communication engines can delay or refuse requests for the swarm content as long as network conditions are poor.

Communication engines in accordance with some embodiments of the invention can communicate instructions to users of swarm interface devices to adjust their capture (e.g., focus point, zoom level, orientation, etc.). Instructions for adjusting capture at a swarm interface device can be provided by a director of a swarm and/or can be automatically generated based on analysis of video being captured at the swarm interface device (e.g., using a machine learning model). In a number of embodiments, a director of a swarm can send instructions to automatically modify capture device settings at one or more swarm sources. For example, directors in accordance with a variety of embodiments of the invention can modify the capture devices in a swarm to shoot in a particular orientation or to modify their white balance settings based on the lighting in a venue. In certain embodiments, communication engines can enable members of a swarm to chat.

In numerous embodiments, distribution engines can distribute multimedia content for a swarm. Swarm multimedia content in accordance with certain embodiments of the invention can include raw multimedia content and/or edited multimedia content. Multimedia content in accordance with certain embodiments of the invention can include video, audio, still images, etc. In a variety of embodiments, swarm content can be distributed to other members or participants of a swarm to be stored on individual devices (e.g., mobile phones, hard drives, cloud storage, etc.). Distribution engines in accordance with many embodiments of the invention can interface with other application platform interfaces (APIs) to distribute content to various other services, such as (but not limited to) social networks, cloud storage, etc.

Although a specific example of a swarm server application is illustrated in this figure, any of a variety of swarm server applications can be utilized to perform processes for managing swarms similar to those described herein as appropriate to the requirements of specific applications in accordance with embodiments of the invention.

Figure 4:
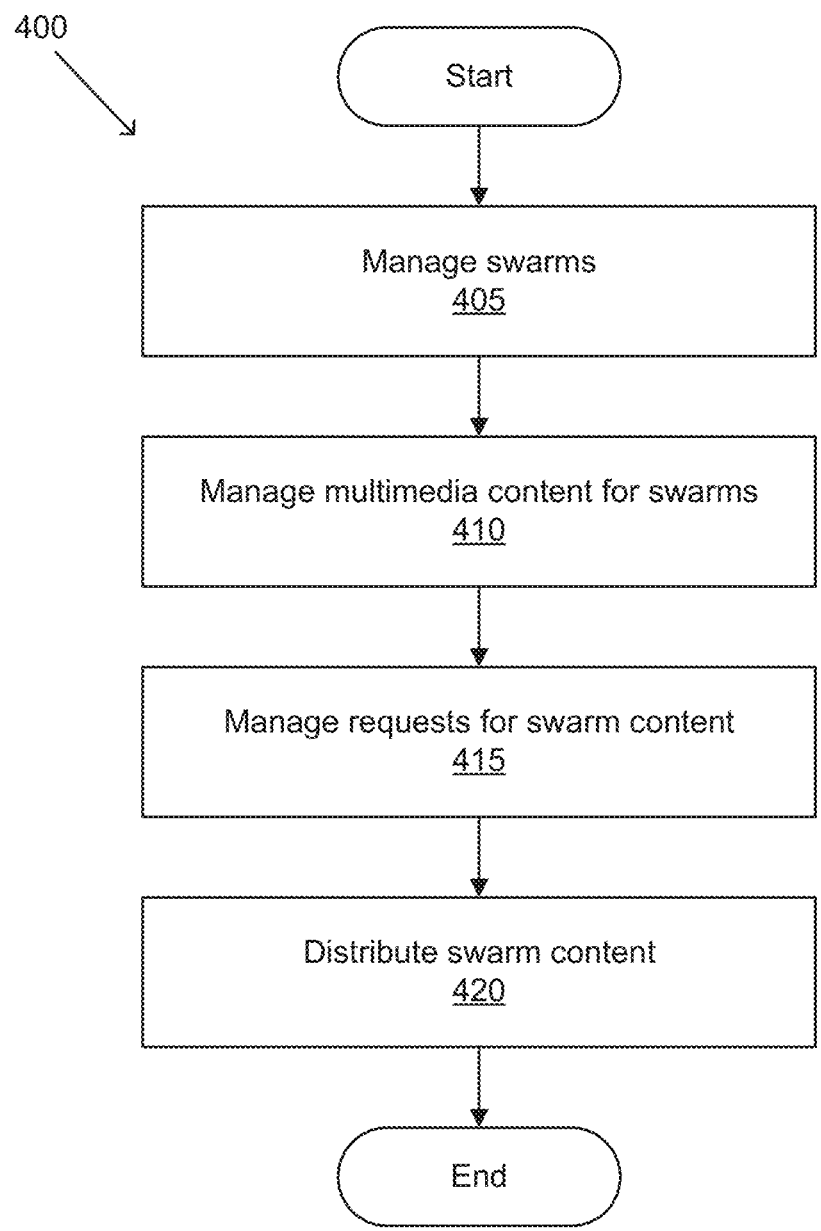
FIG. 4 illustrates an example of a swarm server process in accordance with an embodiment of the invention.

An example of a swarm server process in accordance with an embodiment of the invention is illustrated in FIG. 4. Process 400 manages (405) one or more swarms. Managing a swarm in accordance with numerous embodiments of the invention can provide services to enable users to create new swarms, to search for existing swarms and/or swarm content, and/or to join an existing swarm. In several embodiments, searching for swarms can be based on various search parameters, such as (but not limited to) geolocation data (e.g., geographical bounding boxes), swarm event names, a user's social network, topics of interest, and/or other swarm metadata. In some embodiments, processes can restrict membership in a swarm to users that meet certain criteria (e.g., physically located within a threshold distance of a location associated with the swarm, in possession of a ticket to an event, membership in an association, etc.).

Process 400 manages (410) multimedia content for the swarms. In several embodiments, managing multimedia content can include (but is not limited to) normalizing, synchronizing, transcoding, and/or otherwise editing the multimedia content. Managing multimedia content in accordance with some embodiments of the invention can include providing instructions to one or more swarm interface devices to edit multimedia content stored locally on the swarm interface devices.

Process 400 manages (415) requests for swarm multimedia content. Requests for swarm content can include requests to receive swarm content and/or requests to share swarm content. Managing the requests can include (but is not limited to) providing swarm content (e.g., in a hierarchical manner), providing instructions to adjust a capture, enforcing security and/or permissions, moderating content, delaying publication, and/or clawing back retracted content. In various embodiments, swarm content can be clawed back (e.g., by the original producer, when a clip is not interesting, is embarrassing, accidentally uploaded, and/or when a piece of content has been flagged as inappropriate), removing the content from swarm interface devices and/or from the swarm servers, as well as from any projects where the clawed back content has been used.

Process 400 distributes (420) swarm content. Distributing content in accordance with several embodiments of the invention can include sharing raw or edited swarm content to other members of the swarm and/or to third party services (e.g., cloud storage, social networks, etc.). In a variety of embodiments, swarm content is encrypted with a swarm key to protect the content from users who are not a member of a given swarm.

While specific processes for managing swarms are described above, any of a variety of processes can be utilized to manage swarms as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Figure 5:
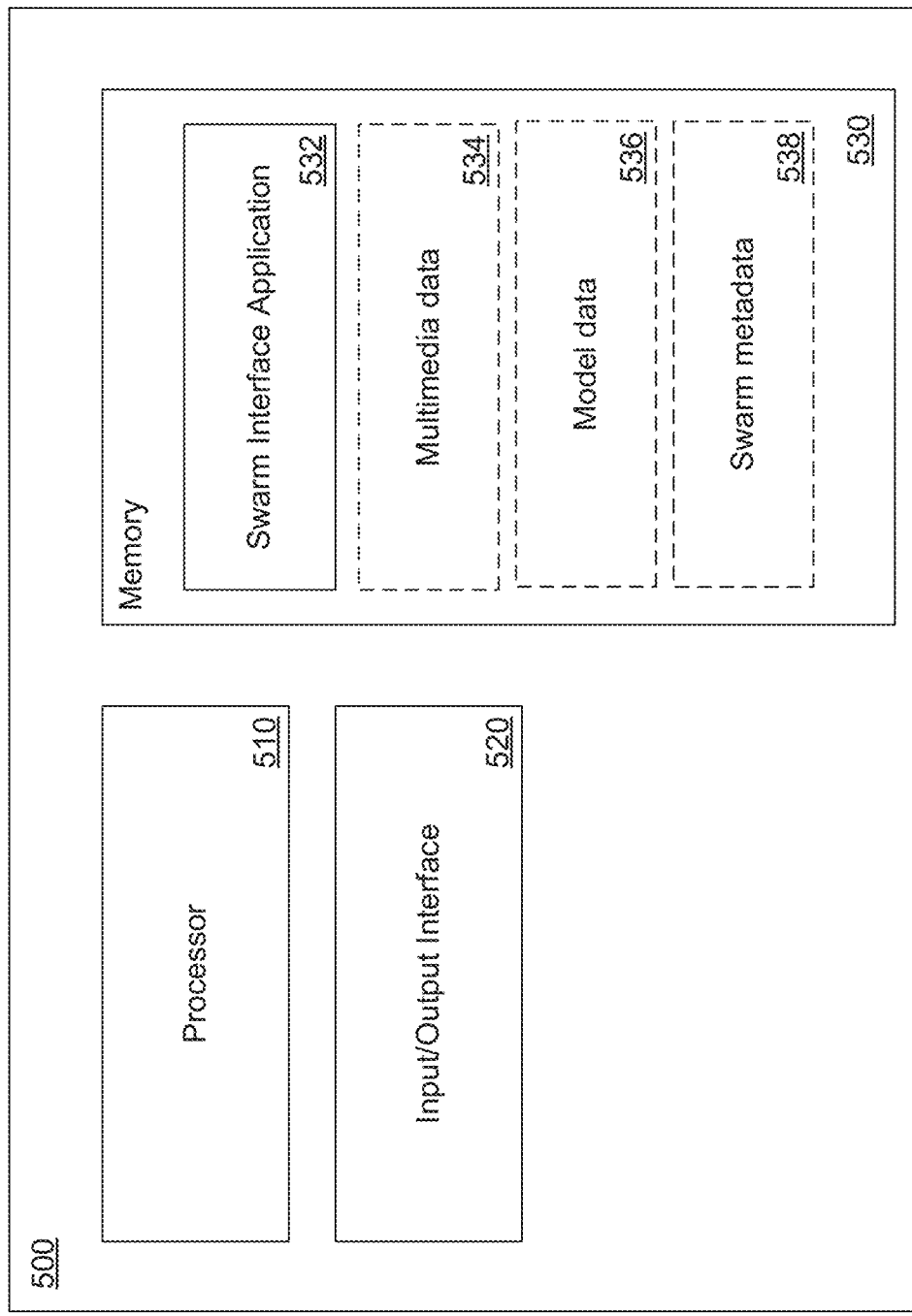
FIG. 5 illustrates an example of a swarm interface device in accordance with an embodiment of the invention.

Turning now to FIG. 5, an example of a swarm interface device in accordance with an embodiment of the invention is illustrated. Swarm interface device 500 includes a processor 510, an input/output interface 520, and a memory 530. Swarm interface devices in accordance with numerous embodiments of the invention can include or can itself be a capture device that can capture video, audio, and/or metadata for a given capture. One skilled in the art will recognize that a swarm interface device may exclude certain components and/or include other components that are omitted for brevity without departing from this invention.

Processor 510 can be any type of logical processing circuitry such as, but not limited to, central processing units, graphics processing units, tensor processing units, neural processing units, field-programmable gate-arrays (FPGAs), application-specific integrated circuits (ASICs), and/or any other processing circuitry as appropriate to the requirements of specific applications of embodiments of the invention.

In a number of embodiments, input/output interfaces can include any of a variety of input/output interfaces, such as (but not limited to) network interfaces, display interfaces, user input interfaces, etc. In numerous embodiments, input/output interfaces can include interfaces to one or more onboard sensors (e.g., video cameras, microphones, accelerometers, GPS modules, compasses, gyroscopes, etc.).

Memory 530 can be volatile, nonvolatile, or a combination of volatile and nonvolatile storage media. In numerous embodiments, memory 530 includes a swarm server application 532. Swarm applications can direct processors to carry out various swarm processes. In this example, memory 530 includes multimedia data 534, model data 536, and swarm metadata 538. Multimedia data in accordance with a number of embodiments of the invention can be obtained from capture devices (e.g., over a network, via onboard sensors, etc.). In numerous embodiments, model data for a swarm interface device can include model parameters and/or training data used for training a model. Models in accordance with a number of embodiments of the invention can be used for various swarm interface device processes, such as (but not limited to) processing multimedia data, object identification, image segmentation, natural language processing, audio synchronization, etc. Swarm metadata in accordance with many embodiments of the invention can describe various properties of the swarm and/or multimedia content of the swarm (or swarm content). Swarm metadata can include, but is not limited to, identification information regarding the video capture devices that make up the swarm, geolocation data describing the location of the swarm, event data describing the event that the swarm is recording, sensor data describing a capture (e.g., an orientation of the camera when the capture was made), multimedia characteristics (e.g., resolution, frame rate, etc.). Although many examples of swarm metadata are described throughout this application, one skilled in the art will recognize that swarm data may include other data regarding the swarm, swarm members, and/or swarm content as appropriate to the requirements of specific applications of embodiments of the invention.

Figure 6:
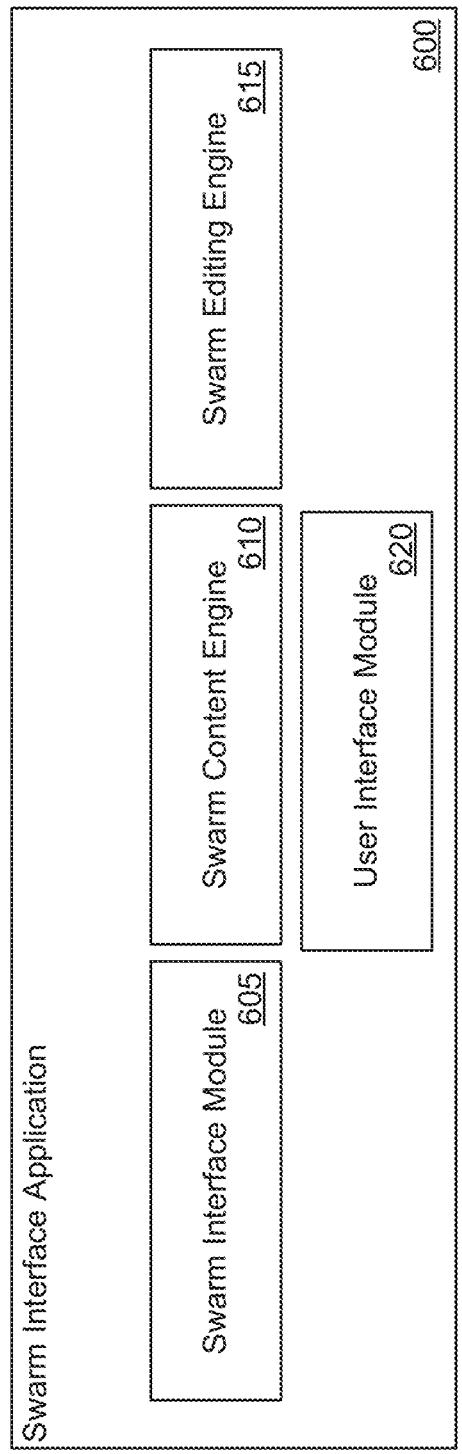
FIG. 6 illustrates an example of a swarm interface application in accordance with an embodiment of the invention.

An example of a swarm interface application in accordance with an embodiment of the invention is illustrated in FIG. 6. Swarm interface application 600 includes swarm interface module 605, swarm content engine 610, swarm editing engine 615, and user interface module 620. One skilled in the art will recognize that a swarm interface application may exclude certain components and/or include other components that are omitted for brevity without departing from this invention.

Swarm interface modules in accordance with various embodiments of the invention can enable a user to join a swarm and/or to create a new swarm. In numerous embodiments, a user can search for swarm content and/or a swarm to join based on a proximity of the swarms to the user, user preferences, previously bookmarked swarms, and/or search parameters provided by the user. Search parameters in accordance with certain embodiments of the invention can include (but are not limited to) geolocation data (e.g., geographical bounding boxes), swarm event names, a group associated with the swarm, a user's social network, subjects of interest identified in the swarm, and/or other swarm metadata. In a number of embodiments, search results can be further ranked or sorted based on proximity, relevance, ratings, user preferences, incorporations of a stream into other swarm projects, etc.

In numerous embodiments, a user can find a swarm to join based on a shared token (e.g., from a friend, via a social network, from an advertisement, etc.) that identifies a particular swarm. Shared tokens in accordance with many embodiments of the invention can include (but are not limited to) a uniform resource locator (URL), text code, password, QR code, audio fingerprint, and/or beacons.

In a number of embodiments, swarm content engines can create and/or retrieve swarm content for one or more swarms. Swarm content engines in accordance with several embodiments of the invention can capture new content, upload new and/or existing content to the swarm, view/receive swarm content, and/or share swarm content.

In a number of embodiments, new content can be captured and live-streamed to a swarm. In a number of embodiments, content to be shared with the swarm can be provided to swarm servers for distribution. Swarm content engines in accordance with certain embodiments of the invention can provide content directly to other swarm interface devices (e.g., over a local network connection and/or peer-to-peer connections). Particularly in the case where many swarm interface devices are in the same geographic location, it can be more efficient to share directly with other swarm interface devices.

In a number of embodiments, swarm content engines can send and/or receive swarm content in a hierarchical manner, beginning with a low-resolution version (e.g., thumbnail, sequence of stills, low-resolution video, etc.) of the content based on network conditions, before providing increasingly higher resolution versions. Swarm content engines in accordance with numerous embodiments of the invention can determine a version of the content to provide based on other factors, such as (but not limited to) user preferences, connection type, etc. In certain embodiments, high-resolution versions (e.g., full-resolution, raw video, etc.) are not encoded and/or provided to the swarm until they are specifically requested (e.g., by a user request, upon inclusion in a swarm project, etc.).

Swarm content engines in accordance with several embodiments of the invention can share edited content and/or live streams with a swarm, social network, and/or other sharing channel.

Permissions for sharing in accordance with certain embodiments of the invention can be determined at the beginning of a session (e.g., by "going live", set for individual captured videos, etc. In many embodiments, swarm content engines can claw back shared multimedia content, removing it from other swarm devices and/or swarm servers, as well as from any swarm projects that may have incorporated the shared content.

Swarm editing engines in accordance with some embodiments of the invention can be used to create swarm projects composed of multimedia content from a swarm. In several embodiments, a swarm project can be edited by multiple members, where each member can maintain a live synchronized view of the project as edits are made. In many embodiments, swarm editing engines can provide various video editing operations such as (but not limited to) cropping, panning, zooming, time shifting, compositing, etc.

Swarm editing engines in accordance with many embodiments of the invention can combine portions of swarm content from multiple heterogeneous sources. In numerous embodiments, video for a portion of a project may be captured from a different source than the audio for the same portion of the project. Swarm content in accordance with a number of embodiments of the invention can be automatically normalized and edited to smooth transitions between different sources. In numerous embodiments, normalization can include, but is not limited to, portrait/landscape compensation, white balance leveling, color correction, color normalization, video stabilization, refocusing, and/or any other normalization process as appropriate to the requirements of specific applications of embodiments of the invention.

In certain embodiments, swarm editing engines allow a member to use swarm content to create other types of outputs, such as scene reconstructions, VR/AR effects, etc. Created projects can be stored locally on the swarm interface device, in cloud storage, at a swarm server, etc.

In some embodiments, user interface modules can provide graphical user interfaces for various processes of a swarm interface device. In several embodiments, user interface modules can provide a graphical user interface (GUI) to allow a user to select a swarm to join and/or to create a new swarm. Such GUIs can include various GUI elements, such as (but not limited to) a map for identifying locations associated with the swarms, text descriptions, cover art, animated images, sample videos, etc. An example of a GUI for joining a swarm is described below with reference to FIG. 10. An example of a GUI for creating a swarm is described below with reference to FIG. 11.

User interface modules in accordance with several embodiments of the invention can provide a GUI to allow a user to interact with swarm content. Such GUIs can include (but are not limited to) a map for identifying other available swarms and/or swarm sources, a viewing area for viewing swarm content, etc. An example of GUIs for interacting with swarm content are described below with reference to FIGS. 12-13.

In some embodiments, user interface modules can provide an editing GUI for editing swarm content. Editing GUIs in accordance with many embodiments of the invention can include various editing tools, representations of the different available swarm sources, a map of swarm sources, and/or a project timeline. An example of GUIs for editing swarm content are described below with reference to FIGS. 14-15.

Although specific example of a swarm interface device and a swarm interface application are illustrated above, any of a variety of swarm interface devices and/or applications can be utilized to perform processes for interfacing with swarms similar to those described herein as appropriate to the requirements of specific applications in accordance with embodiments of the invention.

Swarm Processes

Swarm processes can be performed by swarm interface devices and/or by swarm processing servers. In numerous embodiments, swarm processes can normalize multimedia content captured from a heterogeneous swarm. In a variety of embodiments, swarm processes enable the editing and generation of new multimedia content made up of normalized multimedia content. In some embodiments, swarm processes can determine which pieces of video content are most related. For example, if two video capture devices are pointed at the same location, but are at different points relative to that location, swarm processes can determine that the video content is of the same location and/or subject. In some embodiments, related content is identified using position information from video capture devices such as, but not limited to, global positioning system (GPS) location data, orientation information such as compass readings, gyroscope readings, and/or accelerometer readings, or any other position information as appropriate to the requirements of specific applications of embodiments of the invention. In some embodiments, related content is identified by analyzing the multimedia content itself.

In some embodiments, swarm processes synchronize the multimedia content produced by the swarm. Scene reconstruction techniques, audio synchronization techniques, and/or local clock measurements can be used to synchronize the video content relative to each other. In numerous embodiments, audio and/or video is synchronized using signal fingerprinting and/or watermarking.

In some embodiments, swarm interface devices can be used to share and/or rate different video content. In a variety of embodiments, swarm processes can include suggesting to members that they set up video capture devices in areas that are sparsely covered by the swarm. In some embodiments, incentives can be provided to users that capture high quality content and/or content from locations that are sparsely covered by the swarm. In numerous embodiments, swarm interface devices can provide video editing tools enabling members to generate new video content from the video content produced by the swarm. In some embodiments, new video content is automatically generated.

Figure 7:
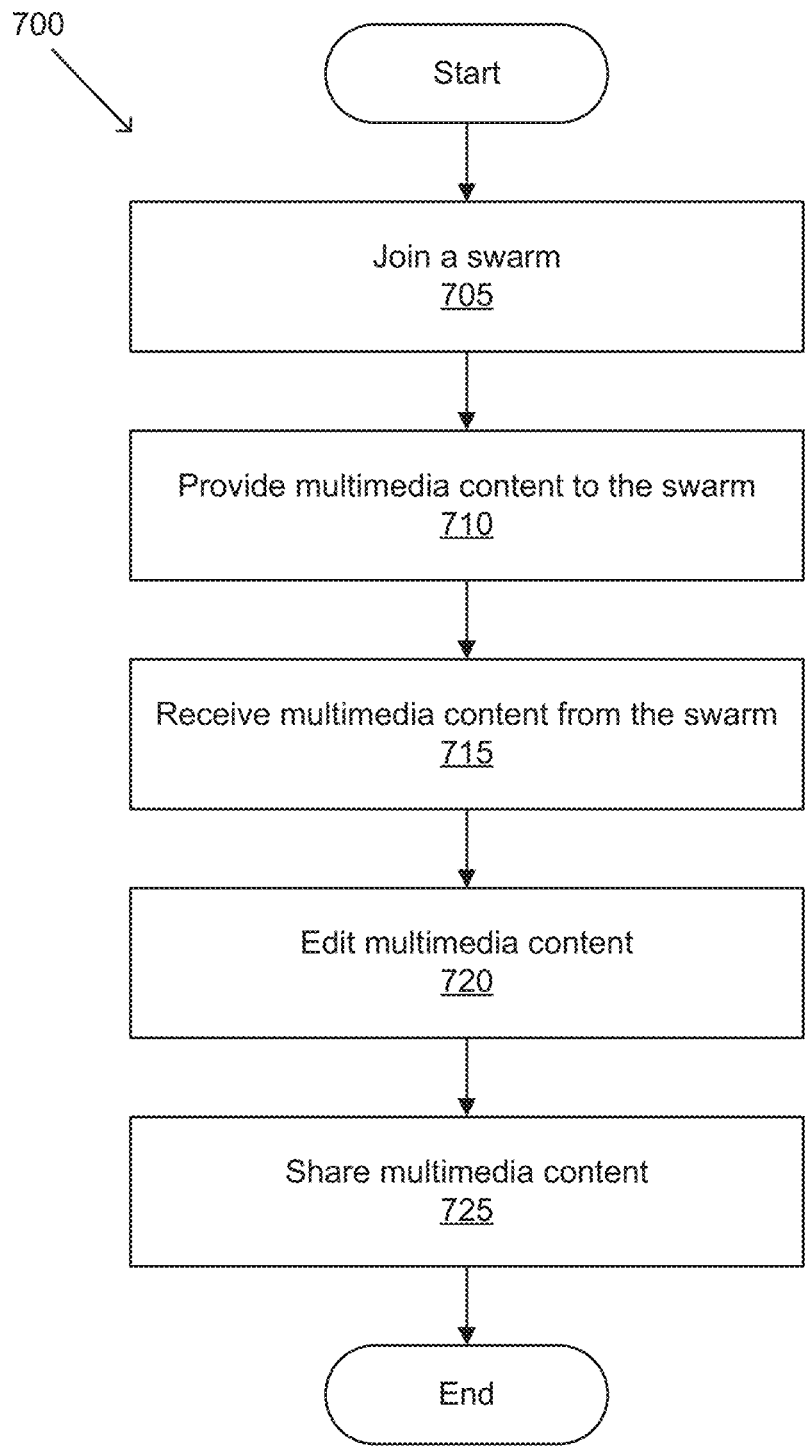
FIG. 7 conceptually illustrates a process for interacting with a swarm in accordance with an embodiment of the invention.

A process for interacting with a swarm in accordance with an embodiment of the invention is conceptually illustrated in FIG. 7. Process 700 joins (705) a swarm. Processes in accordance with many embodiments of the invention can allow users to join (or create) a swarm before or during an event, allowing swarm members at the event to add content to the swarm as the event progresses. In a number of embodiments, swarms may not be created until later, where attendees of the event add their captured content to the swarm after an event has completed.

Process 700 provides (710) multimedia content to the swarm. In many embodiments, processes can provide content captured by a capture device associated with a swarm interface device. Content in accordance with various embodiments of the invention can be provided as a live stream and/or from a storage associated with the swarm interface device. In various embodiments, multimedia content can be content that was previous captured or edited (e.g., in a third-party application). In certain embodiments, multimedia content can be provided in a hierarchical manner, where one or more low-bandwidth versions (e.g., cover art, thumbnails, animated thumbnails, low-resolution video, etc.) are provided to the swarm based on available bandwidth and/or other network conditions until all of the low-bandwidth versions that are desired by the swarm servers have been provided. In several embodiments, processes can provide the highest quality version of the content that is appropriate to the network conditions based on different thresholds for the different versions of the content.

Process 700 receives (715) multimedia content from the swarm. Received swarm content can be viewed and/or edited by a user. In numerous embodiments, swarm content can be presented to the user based on various factors, such as (but not limited to) user preferences, user inputs, geographic locations, swarm content ratings, etc.

Process 700 edits (720) the multimedia content. Processes in accordance with some embodiments of the invention can edit the multimedia content to combine swarm content from swarm sources with locally captured content to create an output swarm project. In various embodiments, processes do not include locally captured content, but rather operate in a director mode, combining swarm content from multiple swarm sources to create a swarm project. The created content can include (but is not limited to) live streams, video presentations, VR/AR experiences, etc.

Alternatively, or conjunctively, processes in accordance with several embodiments of the invention can allow a user to rate swarm content. Rating content in accordance with numerous embodiments of the invention can include (but is not limited to) starring content, providing a thumbs up/down designation, voting up, etc. In a number of embodiments, content can be rated as it is being recorded or viewed and/or after the content has been captured. In numerous embodiments, users can rate content at various levels, including (but not limited to) a swarm, a member, a single multimedia clip, portions of a clip, etc. Ratings in accordance with certain embodiments of the invention can be used to call attention to the content as being interesting. For example, a user could star a clip if a goal was scored or a penalty was captured during a given shot.

Process 700 shares (725) the multimedia content. Processes in accordance with some embodiments of the invention can share edited content and/or live streams with a swarm, social network, and/or other sharing channel.

Figure 8:
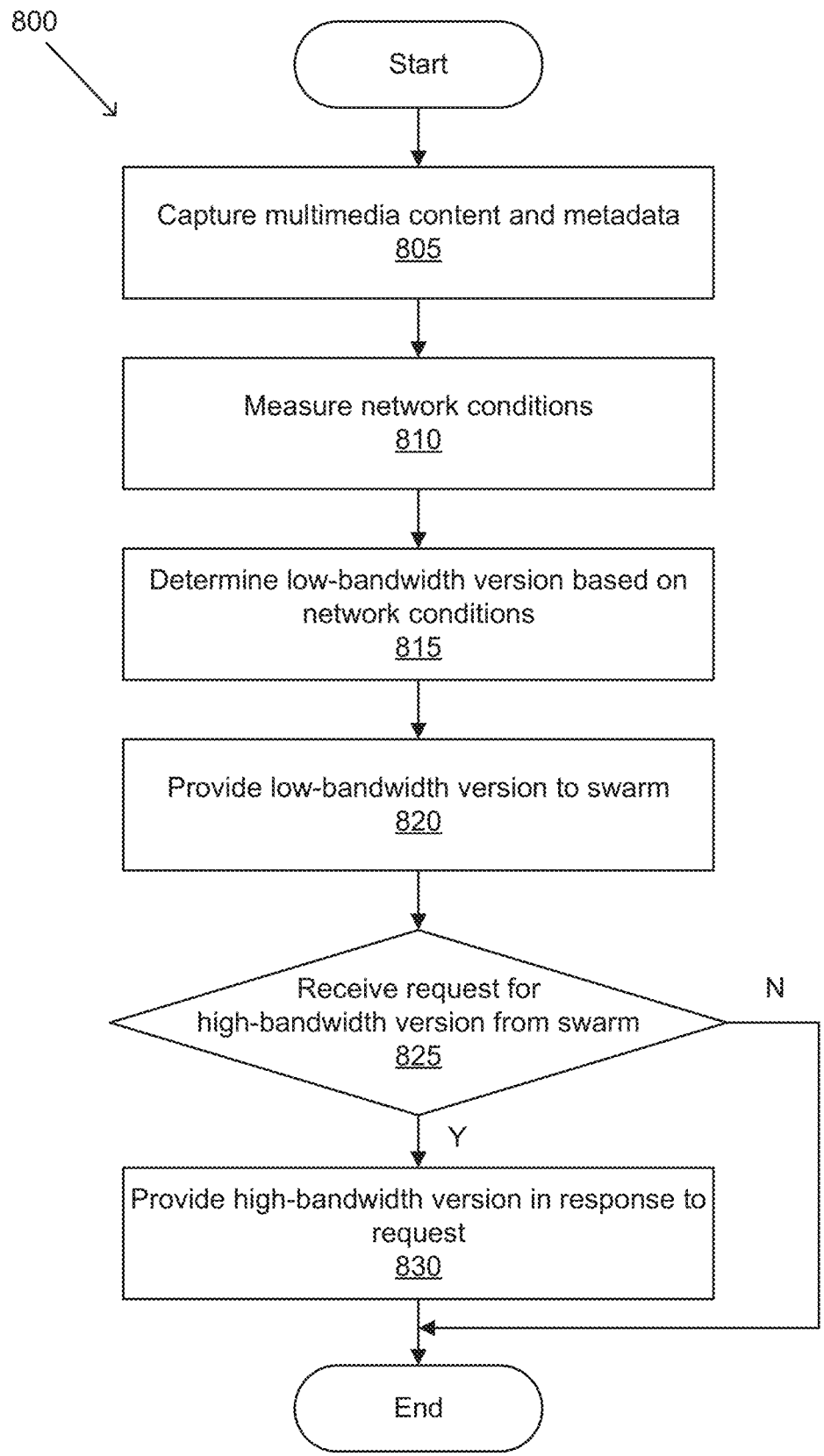
FIG. 8 conceptually illustrates a process for providing multimedia content to a swarm in accordance with an embodiment of the invention.

A process for providing multimedia content to a swarm in accordance with an embodiment of the invention is conceptually illustrated in FIG. 8. Process 800 captures (805) multimedia content and associated metadata. Captured multimedia content in accordance with certain embodiments of the invention can include (but is not limited to) video, audio, still images, etc.

In various embodiments, processes can capture and update metadata associated with the captured multimedia content. Processes in accordance with a number of embodiments of the invention can update the metadata to capture a more precise timestamp for each capture. In numerous embodiments, timestamps are updated to be synchronized with swarm video captured on other swarm interface devices. Timestamps in accordance with a variety of embodiments of the invention can be recorded based on a shared synchronized clock between devices of the swarm.

Metadata in accordance with several embodiments of the invention can include location information, such as (but not limited to) GPS data, indoor location data (e.g., a user's seat in a stadium, beacon-based location information, etc.), and/or a name of an event associated with the swarm. In some embodiments, location information can include an accuracy estimate that indicates how accurate the location information is.

In several embodiments, metadata can include camera information, such as (but not limited to) one or more of attitude, pitch, yaw, roll, compass direction, and/or direction accuracy. Camera information in accordance with various embodiments of the invention can include one or more of a zoom level, field of view, focal length, white balance, white level, and/or flash/lamp status.

Metadata in accordance with numerous embodiments of the invention can also include audio metadata (e.g., minimum, average, maximum audio levels), virtual scene information, target information, and/or depth measurements. Virtual scene information in accordance with certain embodiments of the invention can be captured using various AR library packages. Targets in accordance with certain embodiments of the invention can identify a focused region of an image. In certain embodiments, processes can use object identification processes (e.g., machine learning models, user input labels, etc.) to classify identified targets. For example, processes in accordance with a number of embodiments of the invention can classify a scene and/or identify the presence of a particular person (or jersey number) in swarm content.

Process 800 measures (810) network conditions. Network conditions in accordance with some embodiments of the invention can measure available upload and/or download bandwidth, network stability, etc. In various embodiments, network conditions can reflect conditions at a swarm server, rather than at a swarm interface device.

Process 800 determines (815) a low-bandwidth version of the multimedia content to be provided to the swarm based on the measured network conditions. In certain embodiments, multimedia content can be provided in a hierarchical manner, where one or more low-bandwidth versions (e.g., cover art, thumbnails, animated thumbnails, low-resolution video, etc.) are provided to the swarm based on available bandwidth and/or other network conditions until all of the low-bandwidth versions that are desired by the swarm servers have been provided. In several embodiments, processes can provide the highest quality version of the content that is appropriate to the network conditions based on different thresholds for the different versions of the content. Process 800 provides (820) the determined low-bandwidth version to the swarm.

Process 800 determines (825) whether a request for a high-bandwidth version of the multimedia content has been received from the swarm. In various embodiments, a user of the swarm can request a high-bandwidth version (e.g., high resolution, raw captures, etc.). Processes in accordance with a variety of embodiments of the invention can determine that a request for a high-bandwidth version of the multimedia content has been received when the multimedia content is added to a swarm project. In a variety of embodiments, high-bandwidth versions are not requested until a swarm project has been finalized (e.g., exported, shared, etc.). When the process determines (825) that a request has been received, process 800 provides (830) the high-bandwidth version of the multimedia content in response to the request. Otherwise, the process ends.

Figure 9:
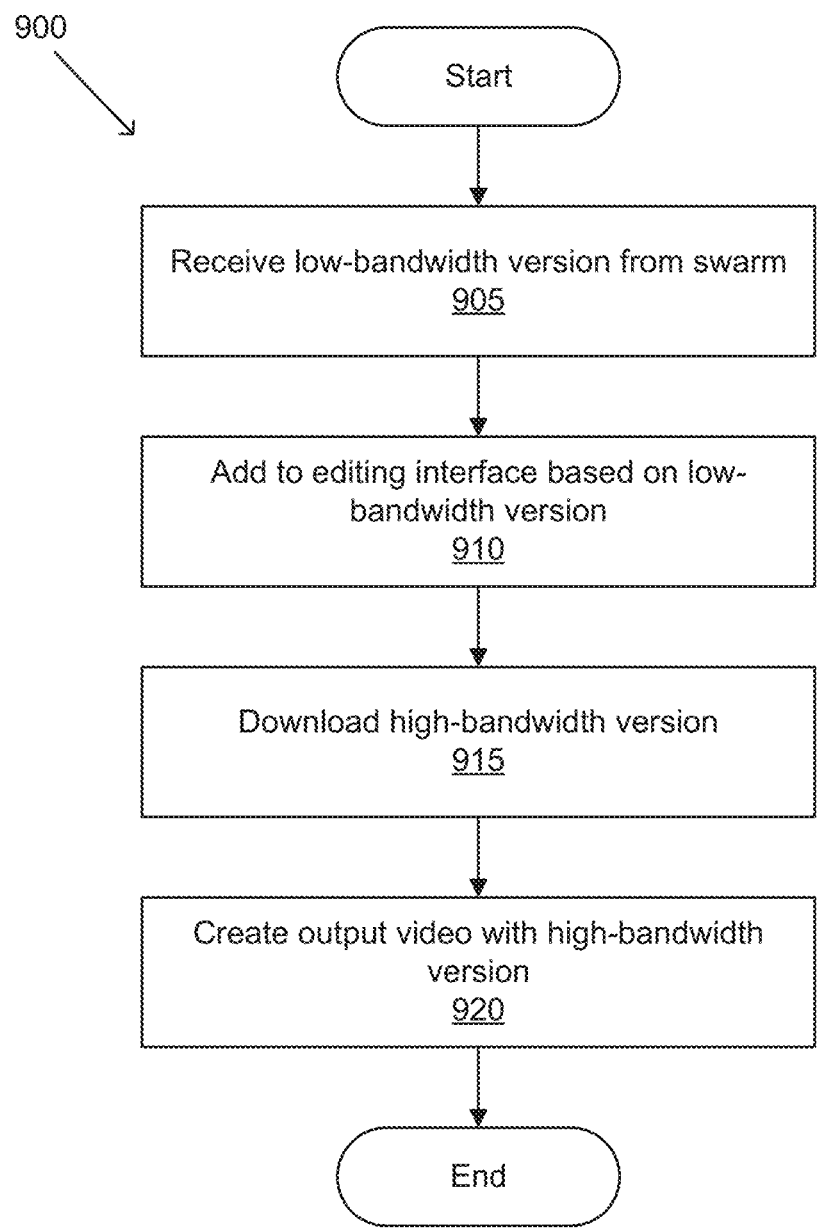
FIG. 9 conceptually illustrates a process for editing swarm multimedia content in accordance with an embodiment of the invention.

A process for editing swarm multimedia content in accordance with an embodiment of the invention is conceptually illustrated in FIG. 9. Process 900 receives (905) a low-bandwidth version of the multimedia content from the swarm. Low-bandwidth version of multimedia content in accordance with various embodiments of the invention can include (but are not limited to) cover art, thumbnails, animated thumbnails, and/or low-resolution video.

Process 900 adds (910) the multimedia content to the editing interface based on the low-bandwidth version of the content. In a variety of embodiments, adding swarm content to the editing interface for a project (e.g., adding multimedia content from a particular source) can indicate that a higher-resolution version of the content will be required.

Process 900 downloads (915) a high-bandwidth version of the content. In certain embodiments, edits can be performed using a low-bandwidth version of the media content while high-bandwidth versions are downloaded in parallel and/or by a background process.

Process 900 creates (920) output video based on the high-bandwidth version of the content. In certain embodiments, created outputs can include (but are not limited to) live streams, video presentations, VR/AR experiences, etc.

While specific processes for interacting with swarms are described above, any of a variety of processes can be utilized to interact with swarms as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

User Interfaces

Figure 10:
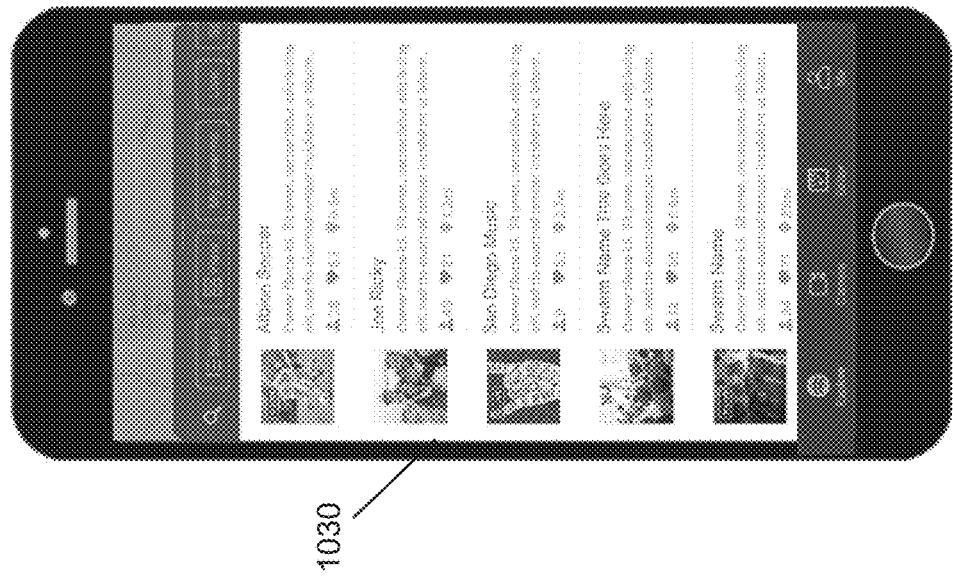
FIG. 10 illustrates an example of a graphical user interface (GUI) for joining a swarm in accordance with an embodiment of the invention.
Figure 10:
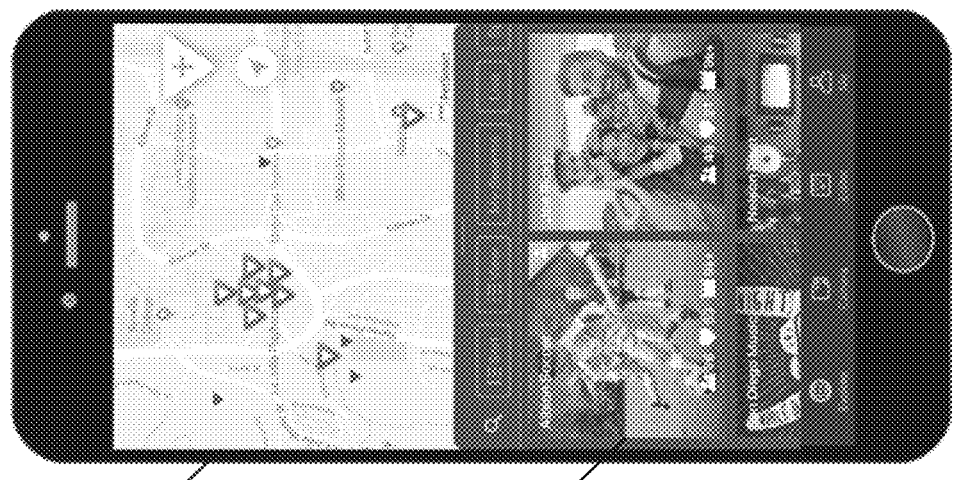

An example of a graphical user interface (GUI) for joining a swarm in accordance with an embodiment of the invention is illustrated in two views 1005-1010 of FIG. 10. The first view 1005 illustrates map 1020 and swarm tiles 1025. Map 1020 illustrates a map with swarm icons (indicated as triangles) that show a location associated with each swarm that can be joined on the map. In some embodiments, swarm icons can include additional information such as (but not limited to) a name for the swarm, a brief description, etc. In some embodiments, hovering over a swarm icon can show additional information about the associated swarm.

Swarm tiles 1025 display a cover image, a title, and swarm indicators. Swarm indicators in accordance with numerous embodiments of the invention can indicate various characteristics of each swarm, such as (but not limited to) a number of members in each swarm, a number of likes for the swarm, and/or a number of videos currently in the swarm. In some embodiments, the swarms presented in the swarm tiles 1025 are selected and/or sorted based on one or more factors, such as (but not limited to) geographic location, user preferences, ratings, popularity, similarity to previously selected swarms, etc. Swarm tiles in accordance with numerous embodiments of the invention can be selected by a user to join and/or view swarm content of the associated swarm.

The second view 1010 shows another swarm GUI with swarm listings 1030. Swarm listings in accordance with many embodiments of the invention can provide textual descriptions, swarm characteristics, and/or cover images.

Figure 11:
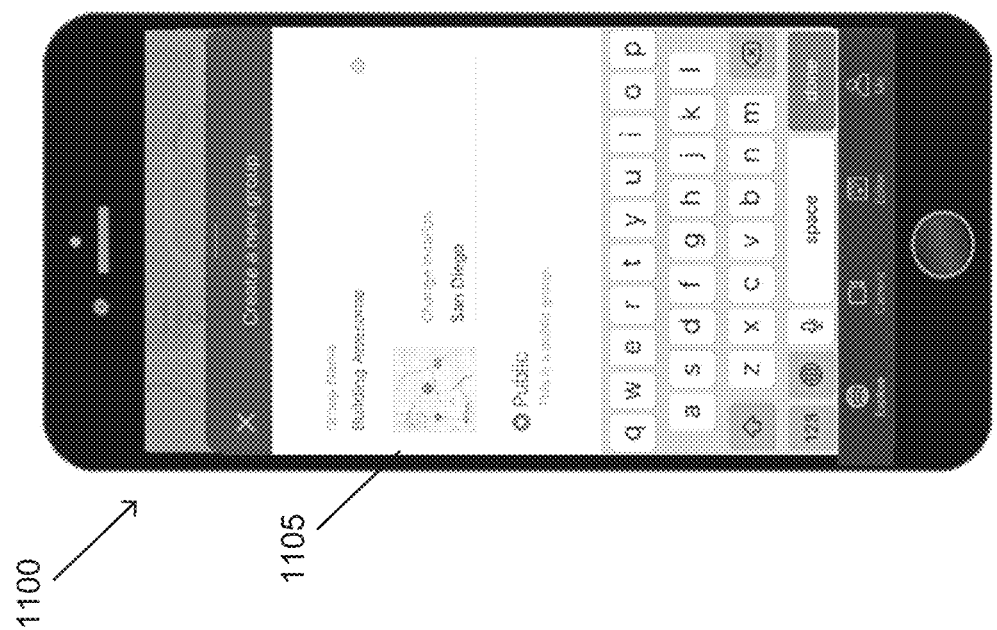
FIG. 11 illustrates an example of a GUI for creating a swarm in accordance with an embodiment of the invention.

An example of a GUI for creating a swarm in accordance with an embodiment of the invention is illustrated in FIG. 11. GUI 1100 includes a swarm settings area 1105 for creating a new swarm (or group). Swarm settings in accordance with a number of embodiments of the invention can include (but are not limited to) a name or title for the swarm, description, location, privacy settings, membership, and/or preferred project settings (e.g., orientation, etc.).

Figure 12:
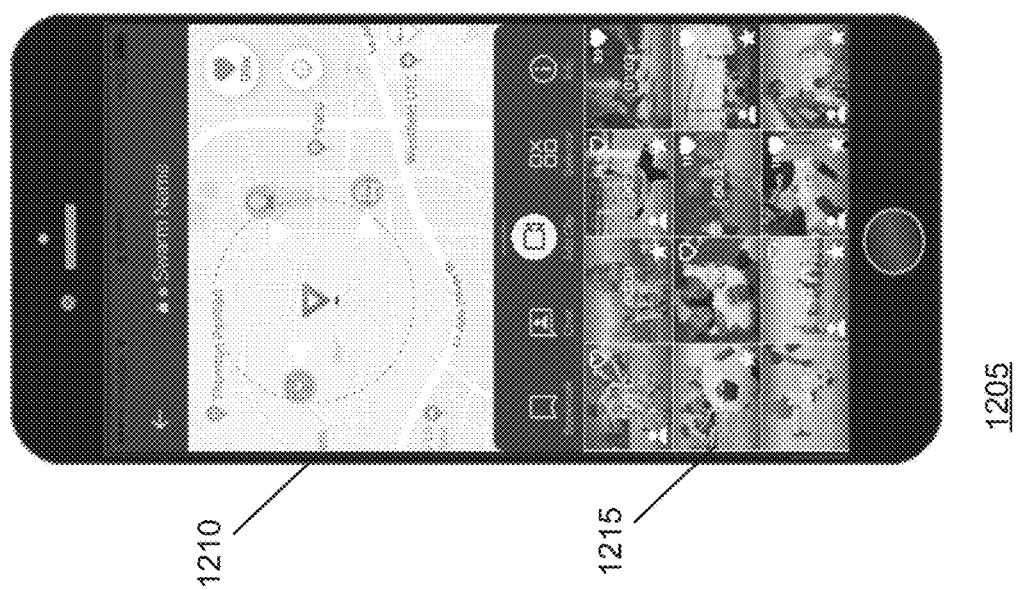
FIG. 12 illustrates an example of a GUI for viewing swarm content in accordance with an embodiment of the invention.

An example of a GUI for viewing swarm content in accordance with an embodiment of the invention is illustrated in FIG. 12. GUI 1205 includes map 1210 and swarm content tiles 1215. Map 1210 indicates a location for a selected swarm (with a triangle indicator), as well as a geographic region associated with the location (indicated by the dotted line). In some embodiments, maps can include multiple swarm indicators, allowing a user to view the regions and/or content (e.g., previews) associated with different swarms. In various embodiments, members of a swarm can message other members to request certain shots and/or to redirect their camera in a different direction based on such previews. Swarm content view 1215 includes tiles for swarm content from other members of the swarm. Swarm content tiles in accordance with some embodiments of the invention can separately represent each individual piece of swarm content for a swarm. In several embodiments, each swarm content tile can represent all of the swarm content of another member of the swarm. Swarm content tiles in accordance with some embodiments of the invention can provide dynamic tiles (e.g., animated images, streaming video, etc.) that update as time progresses. For example, swarm content tiles in accordance with a number of embodiments of the invention can provide live streams of content from other members of the swarm. Live streams in accordance with certain embodiments of the invention can be provided via swarm servers and/or peer-to-peer connections. In several embodiments, swarm content tiles can be selectable UI elements that link to the content. In numerous embodiments, the type of content that is provided will depend on what has been uploaded to the swarm server (e.g., based on network conditions). For example, only a still image may be initially displayed, before a low-resolution version of the stream becomes available.

In some embodiments, swarm GUIs can include social functionalities, such as (but not limited to) chat and/or social networks. In a variety of embodiments, notifications can be provided that allow a user to see when their friends have posted to a swarm, when a swarm is created nearby, when activity (uploads, new members, etc.) at a nearby swarm exceeds a threshold, etc. In various embodiments, members of a swarm can message other members to make requests regarding their captures, such as (but not limited to) requests for certain shots, requests to capture a particular subject, to redirect their camera in a different direction, and/or to modify camera settings.

Figure 13:
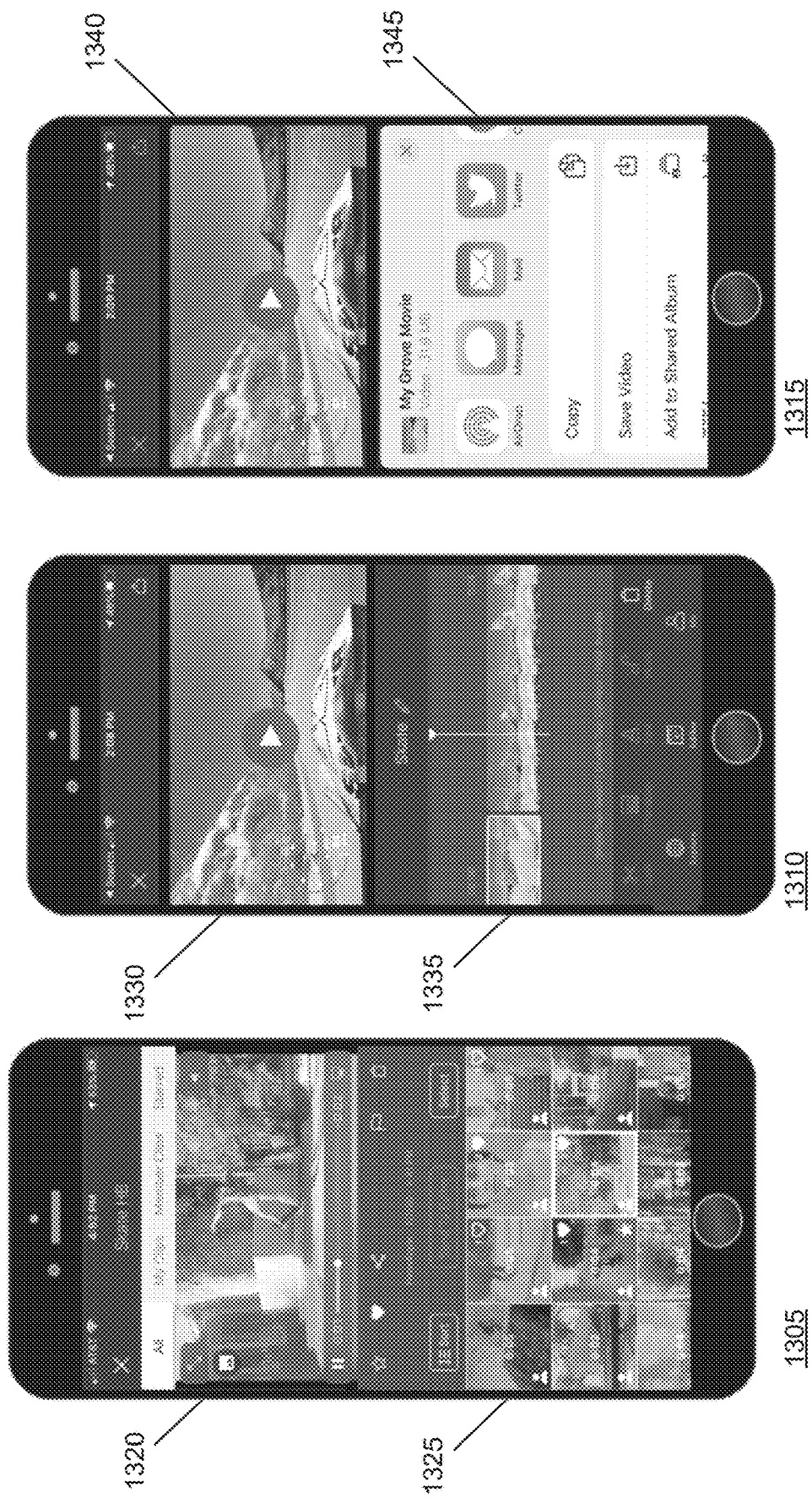
FIG. 13 illustrates examples of a GUI for interacting with swarm content in accordance with an embodiment of the invention.

Examples of a GUI for interacting with swarm content in accordance with an embodiment of the invention are illustrated in FIG. 13. This example is illustrated in three views 1305-1315. The first view 1305 illustrates an interface when a swarm content tile from swarm content view 1325 has been selected. Content viewing area 1320 now shows the selected content along with tools for various tools for sharing, liking, flagging, and deleting the content. In the second view, an editing mode has been entered, with content viewing area 1330 and timeline view 1335. Content viewing area 1330 shows the frame associated with the selected point (indicated by a white line) on the timeline view 1335. Editing mode in accordance with numerous embodiments of the invention can include various tools for editing multimedia content. The third view 1340 shows a sharing view, with a sharing interface 1345 that provides various tools for sharing swarm content to various services. Sharing interfaces in accordance with many embodiments of the invention can utilize operating system APIs to provide a standard sharing interface.

Figure 14:
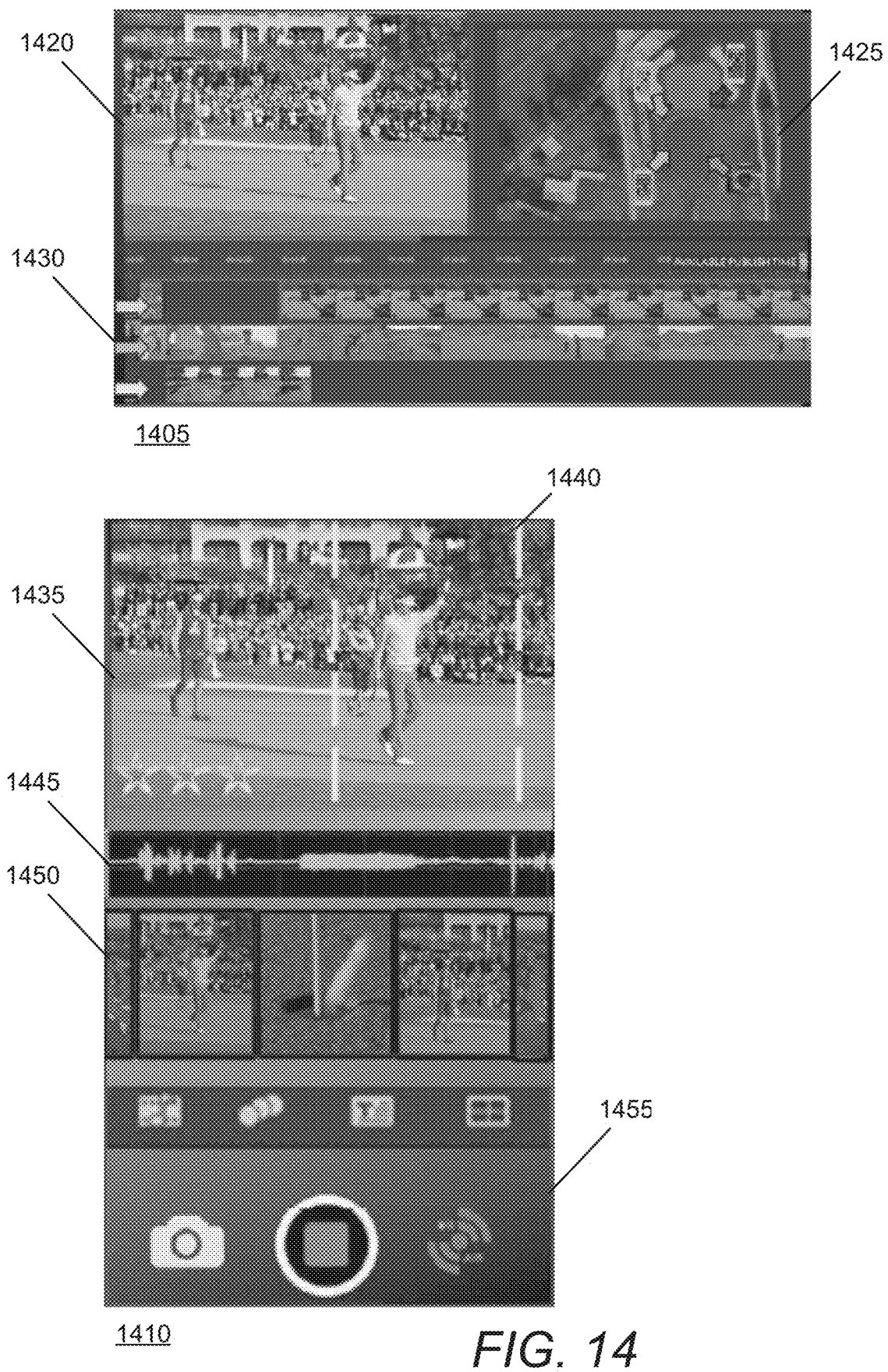
FIG. 14 illustrates an example of a GUI for interacting with swarm content in different orientations in accordance with an embodiment of the invention.

An example of a GUI for interacting with swarm content in different orientations in accordance with an embodiment of the invention is illustrated in FIG. 14. This example illustrates a landscape view 1405 and a portrait view 1410. Landscape view 1405 includes view area 1420, map 1425, and timeline area 1430. View areas in accordance with a variety of embodiments of the invention can provide a live stream of swarm content, either captured locally or from the swarm. In certain embodiments, multiple swarm streams can be available for a given point in time, and view areas can display the active swarm stream (i.e., the stream selected for the swarm project).

Map 1425 illustrates a map that provides icons indicating the location of other swarm members in the area. In this example, each icon includes an image that indicates a capture device type and a direction or orientation (indicated by an arrow) of the capture device. Icons in accordance with a variety of embodiments of the invention can indicate various characteristics of a swarm member, including (but not limited to) an image, field of view, live stream status, etc. In several embodiments, rather than indicating a current location for swarm sources, maps can indicate the location of the swarm sources for a given time on the timeline. As a user scrubs to different portions of the timeline, maps in accordance with some embodiments of the invention can be updated with the source locations at the time of the capture.

Timeline area 1430 shows the swarm content from three of the swarm members indicated in map 1425. In a number of embodiments, swarm content in a timeline area can be dynamically updated with streaming video and/or thumbnail images. Processes in accordance with some embodiments of the invention ensure that the swarm content from the different swarm sources is synchronized (e.g., using signal fingerprinting and/or watermarks). In a variety of embodiments, some swarm content (e.g., from local sources) can be transmitted in a peer-to-peer fashion without passing through a swarm server.

Swarm content in accordance with some embodiments of the invention can be displayed and/or sorted based on various variables, such as (but not limited to) user preferences, ratings, popularity, references, incorporations into swarm projects, exposure levels, aspect ratios, color balance, swarm metadata, and/or identified objects/scenes within the swarm content.

Portrait view 1410 includes view area 1435, audio timeline 1445, swarm content view 1450, and capture controls 1455. This view illustrates a view of the GUI in a portrait orientation. In this example, view area 1435 includes additional overlays 1440. Overlays in accordance with various embodiments of the invention can indicate various characteristics of the viewed multimedia content, including (but not limited to) a preferred orientation, rating, active viewers, and/or capture instructions (e.g., suggestions to modify camera angle, settings, etc.).

Preferred orientations for swarm projects in accordance with several embodiments of the invention can indicate whether content for a swarm project should be displayed in a landscape or portrait orientation. In various embodiments, preferred orientations can be determined for each swarm project (e.g., by a director, a user, etc.). In various embodiments, when a preferred orientation has been designated, view areas can display the video in a non-preferred orientation and provide overlays that indicate the expected portion of the multimedia content that would be captured when it is translated to the preferred orientation. In some embodiments, preferred orientation overlays can be moved by a user to adjust the captured portion. Processes in accordance with certain embodiments of the invention can provide predetermined (e.g., centered) preferred orientation overlays and/or analyze a video image to determine where to present preferred orientation overlays. In numerous embodiments, captured swarm content can be transcoded to the preferred orientation prior to being provided to a swarm. Alternatively, or conjunctively, swarm content can be converted to the preferred orientation at a swarm server and/or is not converted until the video for a swarm project is rendered.

GUIs in accordance with several embodiments of the invention can include audio timelines that display visualizations of associated audio for swarm content. Visualizations of the associated audio can include (but are not limited to) spectrograms along a timeline.

In the example of portrait view 1435, swarm content view 1450 displays swarm content from different members of the swarm. In this example, rather than being displayed along a timeline, a single still image (or animated sequence of stills) is shown for each swarm source.

Capture controls in accordance with a number of embodiments of the invention can be used to direct the capture of content for swarm. In this example, swarm controls 1455 include controls for taking a still image, recording video, and initiating a live stream. In some cases, such as for the recording of news events, it can be beneficial to capture multimedia data in secret. In a variety of embodiments, capture controls can provide a stealth mode for capture, in which the display of the capture device (e.g., a smartphone) is severely dimmed or turned off.

Figure 15:
FIG. 15 illustrates an example of a GUI for editing swarm content in accordance with an embodiment of the invention.

An example of a GUI for editing swarm content in accordance with an embodiment of the invention is illustrated in FIG. 15. In some embodiments, swarm content can be edited on a device separate from the capture devices (e.g., at a desktop computer). In this example, GUI 1505 includes folder view 1510, content view 1515, map view 1520, and timeline view 1525. In this example, folder view 1510 provides access to local media that can be incorporated into a swarm project.

Although specific examples of swarm GUIs are illustrated above, any of a variety of swarm GUIs can be utilized for interacting with swarms similar to those described herein as appropriate to the requirements of specific applications in accordance with embodiments of the invention.

Although specific systems and methods for swarms are discussed above, many different system architectures and processes can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for authoring a multimedia project in a live authoring session at a swarm interface device, the method comprising:

providing a first set of multimedia content comprising a first multimedia clip to a swarm comprising a plurality of swarm members, wherein the plurality of swarm members comprises a plurality of swarm sources;

receiving a second set of multimedia content comprising a second multimedia clip from at least one of the plurality of swarm sources, where either the first or second multimedia clip bears a timestamp;

providing an editing graphical user interface (GUI) to the swarm interface device for authoring a multimedia project displaying the first set of multimedia content and the second set of multimedia content, where the editing GUI provides tools for adding additional sets of multimedia content to the multimedia project;

receiving a low-bandwidth version of the second multimedia clip from the second set of multimedia content to be presented in the editing GUI at the swarm interface device;

editing the multimedia project by synchronizing the first multimedia clip from the first set of multimedia content bearing a timestamp alongside at least one piece of multimedia content comprising the second multimedia clip from the second set of multimedia content bearing another timestamp along a single project timeline viewable on the swarm interface, where the swarm interface device maintains a live view of edits made by other swarm interface devices in the session in the editing GUI; and upon determining that the second multimedia clip from the second set of multimedia content has been added to the multimedia project, downloading, in a background process, a high-bandwidth version of the second multimedia clip.

2. The method of claim 1, wherein:
the multimedia project is a live stream; and
editing multimedia content comprises:
  providing streamed live content captured at the swarm interface device as part of the live stream;
  providing streamed live content received from at least one of the plurality of swarm sources as part of the live stream;
  arranging the streamed live content captured at the swarm interface device alongside the streamed live content received from at least one of the plurality of swarm sources on the single project timeline; and
  combining the arranged live streamed content into the multimedia project.

3. The method of claim 1, wherein providing the first set of multimedia content comprises streaming live content captured at the swarm interface device to a swarm member of the plurality of swarm members, wherein streaming the live content comprises transmitting the live content over a local peer-to-peer network.

4. The method of claim 1, wherein the plurality of swarm sources comprises a professional camera linked to a separate swarm interface device and at least a mobile device comprising a camera, wherein the separate swarm interface device and the mobile device are communicatively linked to a set of one or more swarm servers.

5. The method of claim 1 further comprising joining the swarm, wherein joining the swarm comprises:
  displaying a plurality of available swarms based on at least a geographic location of the swarm interface device;
  receiving input selecting a particular swarm of the plurality of available swarms; and
  joining the selected particular swarm.

6. The method of claim 1, wherein providing the first set of multimedia content comprises:
  determining a network condition for communications between the swarm interface device and a set of swarm servers;
  selecting a low-bandwidth format for the first set of multimedia content based on the determined network condition;
  formatting the first set of multimedia content to the selected low-bandwidth format; and
  providing the low-bandwidth format of the first set of multimedia content to the swarm.

7. The method of claim 1, wherein the multimedia project is a highlight reel, wherein editing multimedia content comprises:
  identifying a third set of multimedia content comprising at least one piece of content from the first set of multimedia content and at least one piece of content from the second set of multimedia content based on metadata associated with the first and second sets of multimedia content, wherein the metadata comprises at least one of a set consisting of a synchronized timestamp, camera orientation, content rating, camera direction, focus object type, focus status, white level, white balance, audio level, and camera type; and
  creating the highlight reel based on the third set of multimedia content.

8. The method of claim 7, wherein editing multimedia content further comprises automatically creating a credits video segment by:
  determining an author for each piece of multimedia content from the second set of multimedia content included in the multimedia project; and
  generating the credits video segment to provide attribution to contributors of the multimedia content.

9. The method of claim 1, wherein editing multimedia content comprises:
  displaying representations for at least one piece of multimedia content from each swarm source of the second set of multimedia content;
  displaying a map with a set of one or more indicators indicating a location on the map associated with the at least one piece of content and the associated swarm source;
  receive a selection of an indicator of the set of indicators to select an associated swarm source; and
  displaying representations for multimedia content from the second set of multimedia content from the associated swarm source that can be added to the multimedia project.

10. A non-transitory machine readable medium containing processor instructions for authoring a multimedia project in a live authoring session at a swarm interface device, where execution of the instructions by a processor causes the processor to perform a process that comprises:
  providing a first set of multimedia content comprising a first multimedia clip to a swarm comprising a plurality of swarm members, wherein the plurality of swarm members comprises a plurality of swarm sources;
  receiving a second set of multimedia content comprising a second multimedia clip from at least one of the plurality of swarm sources, where either the first or second multimedia clip bears a timestamp;
  providing an editing graphical user interface (GUI) to the swarm interface device for authoring a multimedia project displaying the first set of multimedia content and the second set of multimedia content, where the editing GUI provides tools for adding additional sets of multimedia content to the multimedia project;

receiving a low-bandwidth version of the second multimedia clip from the second set of multimedia content to be presented in the editing GUI at the swarm interface device;

editing the multimedia project by synchronizing the first multimedia clip from the first set of multimedia content bearing a timestamp alongside at least one piece of multimedia content comprising the second multimedia clip from the second set of multimedia content bearing another timestamp along a single project timeline viewable on the swarm interface, where the swarm interface device maintains a live view of edits made by other swarm interface devices in the session in the editing GUI; and upon determining that the second multimedia clip from the second set of multimedia content has been added to the multimedia project, downloading, in a background process, a high-bandwidth version of the second multimedia clip.

11. The non-transitory machine readable medium of claim 10, wherein:

the multimedia project is a live stream; and editing multimedia content comprises:

providing streamed live content captured at the swarm interface device as part of the live stream;

providing streamed live content received from at least one of the plurality of swarm sources as part of the live stream;

arranging the streamed live content captured at the swarm interface device alongside the streamed live content received from at least one of the plurality of swarm sources on the single project timeline; and combining the arranged live streamed content into the multimedia project.

12. The non-transitory machine readable medium of claim 10, wherein providing the first set of multimedia content comprises streaming live content captured at the swarm interface device to a swarm member of the plurality of swarm members, wherein streaming the live content comprises transmitting the live content over a local peer-to-peer network.

13. The non-transitory machine readable medium of claim 10, wherein the plurality of swarm sources comprises professional camera linked to a separate swarm interface device and at least a mobile device comprising a camera, wherein the separate swarm interface device and the mobile device are communicatively linked to a set of one or more swarm servers.

14. The non-transitory machine readable medium of claim 10, wherein the process further comprises joining the swarm, wherein joining the swarm comprises:

displaying a plurality of available swarms based on at least a geographic location of the swarm interface device;

receiving input selecting a particular swarm of the plurality of available swarms; and joining the selected particular swarm.

15. The non-transitory machine readable medium of claim 10, wherein providing the first set of multimedia content comprises:

determining a network condition for communications between the swarm interface device and a set of swarm servers;

selecting a low-bandwidth format for the first set of multimedia content based on the determined network condition;

formatting the first set of multimedia content to the selected low-bandwidth format; and providing the low-bandwidth format of the first set of multimedia content to the swarm.

16. The non-transitory machine readable medium of claim 10, wherein the multimedia project is a highlight reel, wherein editing multimedia content comprises:

identifying a third set of multimedia content comprising at least one piece of content from the first set of multimedia content and at least one piece of content from the second set of multimedia content based on metadata associated with the first and second sets of multimedia content, wherein the metadata comprises at least one of a set consisting of a synchronized timestamp, camera orientation, content rating, camera direction, focus object type, focus status, white level, white balance, audio level, and camera type; and creating the highlight reel based on the third set of multimedia content.

17. The non-transitory machine readable medium of claim 16, wherein editing multimedia content further comprises automatically creating a credits video segment by:

determining an author for each piece of multimedia content from the second set of multimedia content included in the multimedia project; and generating the credits video segment to provide attribution to contributors of the multimedia content.

18. The non-transitory machine readable medium of claim 10, wherein editing multimedia content comprises:

displaying representations for at least one piece of multimedia content from each swarm source of the second set of multimedia content;

displaying a map with a set of one or more indicators indicating a location on the map associated with the at least one piece of content and the associated swarm source;

receive a selection of an indicator of the set of indicators to select an associated swarm source; and displaying representations for multimedia content from the second set of multimedia content from the associated swarm source that can be added to the multimedia project.

19. The non-transitory machine readable medium of claim 10 further comprising receiving metadata the for second set of multimedia content, wherein the metadata comprises at least one of a set consisting of location, direction, camera parameters, focus parameters, detected objects, synchronized time, text commentary, and hash tags.

20. The non-transitory machine readable medium of claim 19 further comprising displaying representations of the second set of multimedia, wherein the representations are sorted based at least in part on the received metadata.

21. The non-transitory machine readable medium of claim 10 further comprising transmitting a set of control instructions to at least one of the plurality of swarm sources to automatically modify capture settings of the at least one swarm source.

22. The non-transitory machine readable medium of claim 10, further comprising requesting removal of at least one piece of the provided first set of multimedia content from the plurality of swarm members, wherein the at least one piece of multimedia content is automatically removed from each of the plurality of swarm members.

23. The non-transitory machine readable medium of claim 10, wherein the multimedia project is at least one of a scene reconstruction, an augmented reality (AR) presentation, and a virtual reality (VR) presentation.

* * * * *